(12) United States Patent
Chen et al.

(10) Patent No.: US 10,397,612 B2
(45) Date of Patent: *Aug. 27, 2019

(54) THREE-DIMENSIONAL VIDEO ENCODING METHOD, THREE-DIMENSIONAL VIDEO DECODING METHOD, AND RELATED APPARATUS

(71) Applicant: Huawei Technologies Co., Ltd., Shenzhen (CN)

(72) Inventors: Xu Chen, Shenzhen (CN); Xiaozhen Zheng, Shenzhen (CN); Yongbing Lin, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/113,531

(22) Filed: Aug. 27, 2018

(65) Prior Publication Data

US 2018/0367813 A1 Dec. 20, 2018

Related U.S. Application Data

(63) Continuation of application No. 15/362,448, filed on Nov. 28, 2016, now Pat. No. 10,116,965, which is a
(Continued)

(30) Foreign Application Priority Data

Oct. 10, 2014  (CN) .......................... 2014 1 0531608

(51) Int. Cl.
H04N 19/597 (2014.01)
H04N 19/176 (2014.01)
(Continued)

(52) U.S. Cl.
CPC ......... H04N 19/597 (2014.11); H04N 19/105 (2014.11); H04N 19/176 (2014.11);
(Continued)

(58) Field of Classification Search
CPC .. H04N 19/105; H04N 19/176; H04N 19/182; H04N 19/184; H04N 19/44; H04N 19/593; H04N 19/597; H04N 19/70
See application file for complete search history.

(56) References Cited

U.S. PATENT DOCUMENTS 10,116,965 B2 * 10/2018 Chen .................... H04N 19/184
2011/0038418 A1    2/2011  Pandit et al.
(Continued)

FOREIGN PATENT DOCUMENTS

CN   102017628 A   4/2011
CN   103597837 A   2/2014
(Continued)

OTHER PUBLICATIONS

Chen et al. "3D-CE2: Single depth intra mode for 3D-H EVC," Joint Collaborative Team on 3D Video Coding Extensions of ITU-T SG 16 WP 3 and ISO/IEC JTC I/SC 29/WG 11,Jul. 9, 2014, pp. 1-2 (Year: 2014).*
(Continued)

Primary Examiner — Anand S Rao
Assistant Examiner — Tyler B Edwards
(74) Attorney, Agent, or Firm — Conley & Rose, P.C.

(57) ABSTRACT

A three-dimensional (3D) video encoding method, decoding method, and related apparatus is disclosed. The decoding method may include decoding a video bitstream to obtain a single sample flag bit corresponding to a current image block in a current depth map, performing detection on a first adjacent prediction sampling point and a second adjacent prediction sampling point of the current image block in the current depth map if the single sample flag bit obtained by decoding indicates that a decoding mode corresponding to the current image block is a single depth intra-frame mode (SDM), and constructing a sample candidate set according
(Continued)

to results of the detection on the first adjacent prediction sampling point and the second adjacent prediction sampling point, where the sample candidate set includes a first index location and a second index location, decoding the video bitstream to obtain a single sample index flag bit corresponding to the current image block.

20 Claims, 7 Drawing Sheets

Related U.S. Application Data continuation of application No. PCT/CN2015/084074, filed on Jul. 15, 2015.

(51) Int. Cl.
    *H04N 19/184*     (2014.01)
    *H04N 19/44*     (2014.01)
    *H04N 19/105*     (2014.01)
    *H04N 19/70*     (2014.01)
    *H04N 19/593*     (2014.01)
    *H04N 19/182*     (2014.01)

(52) U.S. Cl.
    CPC ......... *H04N 19/182* (2014.11); *H04N 19/184* (2014.11); *H04N 19/44* (2014.11); *H04N 19/593* (2014.11); *H04N 19/70* (2014.11)

(56) References Cited

U.S. PATENT DOCUMENTS

| | | |
|---|---|---|
| 2013/0176390 A1 | 7/2013 | Chen et al. |
| 2014/0078254 A1 | 3/2014 | Lin et al. |
| 2015/0201216 A1 | 7/2015 | Lin et al. |
| 2017/0019665 A1 | 1/2017 | Chen et al. |

FOREIGN PATENT DOCUMENTS

| | | |
|---|---|---|
| CN | 103907346 A | 7/2014 |
| CN | 104333760 A | 2/2015 |
| CN | 106105195 A | 11/2016 |
| WO | 2015135473 A1 | 9/2015 |

OTHER PUBLICATIONS

Machine Translation and Abstract of Chinese Publication No. CN104333760, Feb. 4, 2015, 74 pages.
Chen, Y., et al, "Single depth intra mode for 3D-HEVC," JCT3V-H0087, Mar. 29-Apr. 4, 2014, 3 pages.
Chen, Y., et al., "3D-CE2: Single depth intra mode for 3D-HEVC," JCT3V-I0095, XP030132396, Jul. 3-9, 2014, 4 pages.
Chen, Y., et al., "Test Model 9 of 3D-HEVC and MV-HEVC," ISO/IEC JTC1/SC29/WG11 N14704, XP30021440, Jul. 2014, 58 pages.
Lai, P., et al., "Non-SCCE3 Test D.1 Single Color Mode," JCTVC-R0198_r2, XP30116490, Jun. 30-Jul. 9, 2014, 8 pages.
Zheng, J., et al., "Cleanup of Single Depth Intra Mode Simplification," JCT3V-K0051, XP30132718, Feb. 12-18, 2015, 6 pages.
Foreign Communication From a Counterpart Application, European Application No. 15848924.5, Extended European Search Report dated Feb. 22, 2017, 10 pages.
Foreign Communication From a Counterpart Application, Chinese Application No. 201410531608.7, Chinese Office Action dated Jun. 28, 2017, 12 pages.
Foreign Communication From a Counterpart Application, Chinese Application No. 201410531608.7, Chinese Office Action dated Jan. 19, 2017, 9 pages.
Foreign Communication From a Counterpart Application, PCT Application No. PCT/CN2015/084074, English Translation of International Search Report dated Aug. 26, 2015, 2 pages.
Foreign Communication From a Counterpart Application, PCT Application No. PCT/CN2015/084074, English Translation of Written Opinion dated Aug. 26, 2015, 7 pages.

\* cited by examiner

THREE-DIMENSIONAL VIDEO ENCODING METHOD, THREE-DIMENSIONAL VIDEO DECODING METHOD, AND RELATED APPARATUS

CROSS-REFERENCE TO RELATED APPLICATIONS

This application is a continuation of U.S. patent application Ser. No. 15/362,448, filed on Nov. 28, 2016, which is a continuation of International Application No. PCT/CN2015/084074, filed on Jul. 15, 2015, which claims priority to Chinese Patent Application No. 201410531608.7, filed on Oct. 10, 2014. All of the aforementioned patent applications are hereby incorporated by reference in their entireties.

TECHNICAL FIELD

The present application relates to the field of image processing technologies, and further, to a three-dimensional (3D) video encoding method, a 3D video decoding method, and a related apparatus.

BACKGROUND

With development of a photoelectric gathering technology and an increasingly growing requirement for a high-definition digital video, a video data volume is growing, finite heterogeneous transmission bandwidth and diversified video applications continuously impose a higher requirement for video encoding efficiency, and work of formulating the High Efficiency Video Coding (HEVC) standard starts as needed.

A basic principle of video encoding and compression is to eliminate redundancy to an utmost extent using a correlation between a space domain, a time domain, and a code word. Currently, in a popular practice, the video encoding and compression are implemented by performing steps such as prediction (including intra-frame prediction and inter-frame prediction), conversion, quantization, and entropy encoding using a block-based hybrid video encoding framework. In an intra-frame prediction technology, redundant information of a current image block is eliminated using space pixel information of the current image block, to obtain a residual. In an inter-frame prediction technology, redundant information of a current image block is eliminated using pixel information of a coded or decoded image adjacent to a current image, to obtain a residual. This encoding framework demonstrates strong vitality. This block-based hybrid video encoding framework continues to be used in HEVC as well.

In 3D video encoding and decoding, to reflect depth information of an object, encoding and decoding need to be performed on a depth map. Data of a depth map has some signal characteristics different from data of a texture map. The most prominent signal characteristic is that there are many smooth areas with similar depth values, and in many cases, a same depth value may be used for sampling points in a smooth area. Therefore, an encoding and decoding algorithm based on a single depth intra-frame mode (SDM) is introduced for an image block of a depth map. A core of the SDM is to simplify reconstruction of a current image block, and one depth value may be used to represent a depth value of an entire smooth area of the current image block.

In a traditional SDM-based encoding and decoding algorithm, at least five adjacent prediction sampling points around a current image block need to be detected according to a specified detection sequence, to obtain a corresponding depth value and write the corresponding depth value into a sample candidate set, that is, in a traditional mechanism, the sample candidate set is constructed according to detection results of the at least five adjacent prediction sampling points. Because the at least five adjacent prediction sampling points need to be referred to when the sample candidate set is constructed, encoding and decoding complexity of the traditional mechanism may be relatively high, and relatively large storage space is needed.

SUMMARY

Embodiments of the present application provide a 3D video encoding method, a 3D video decoding method, and a related apparatus such that complexity of an SDM-based encoding and decoding algorithm can be reduced and a storage space occupation requirement decreases.

A first aspect of the present application provides a 3D video decoding method, including decoding a video bitstream to obtain a single sample flag bit corresponding to a current image block in a current depth map, performing detection on a first adjacent prediction sampling point and a second adjacent prediction sampling point of the current image block in the current depth map if the single sample flag bit obtained by decoding indicates that a decoding mode corresponding to the current image block is a SDM, and constructing a sample candidate set according to results of the detection on the first adjacent prediction sampling point and the second adjacent prediction sampling point, where available adjacent prediction sampling points of the current image block include only the first adjacent prediction sampling point and the second adjacent prediction sampling point, decoding the video bitstream to obtain a single sample index flag bit corresponding to the current image block, and obtaining, according to an index location indicated by the single sample index flag bit obtained by decoding, a candidate depth value located in the index location that is indicated by the single sample index flag bit and that is in the sample candidate set, using the candidate depth value as a prediction sample value of some or all of pixels of the current image block, and reconstructing the current image block using the prediction sample value of some or all of the pixels of the current image block.

With reference to the first aspect, in a first possible implementation manner, the constructing a sample candidate set according to results of the detection on the first adjacent prediction sampling point and the second adjacent prediction sampling point includes, if it is detected that the first adjacent prediction sampling point is available, and it is detected that the second adjacent prediction sampling point is available, writing a depth value of the first adjacent prediction sampling point into a first index location in the sample candidate set corresponding to the current image block, and writing a depth value of the second adjacent prediction sampling point into a second index location in the sample candidate set, or if it is detected that the first adjacent prediction sampling point is available, and it is detected that the second adjacent prediction sampling point is unavailable, writing a depth value of the first adjacent prediction sampling point into a first index location in the sample candidate set corresponding to the current image block, and writing the depth value of the first adjacent prediction sampling point into a second index location in the sample candidate set, or if it is detected that the first adjacent prediction sampling point is available, and it is detected that the second adjacent prediction sampling point is unavailable, writing a depth value of the first adjacent prediction sampling point into a first index location in the sample candidate set corresponding to the current image block, and writing, into a second index location in the sample candidate set, a depth value obtained by adding the depth value of the first adjacent prediction sampling point to a first adjustment value, or if it is detected that the first adjacent prediction sampling point is available, and it is detected that the second adjacent prediction sampling point is unavailable, writing a depth value of the first adjacent prediction sampling point into a first index location in the sample candidate set corresponding to the current image block, and writing, into a second index location in the sample candidate set, a depth value obtained by subtracting a second adjustment value from the depth value of the first adjacent prediction sampling point, or if it is detected that the first adjacent prediction sampling point is available, and it is detected that the second adjacent prediction sampling point is unavailable, writing a depth value of the first adjacent prediction sampling point into a first index location in the sample candidate set corresponding to the current image block, and using a second preset depth value as a candidate value recorded in a second index location in the sample candidate set, or if it is detected that the first adjacent prediction sampling point is unavailable, and it is detected that the second adjacent prediction sampling point is unavailable, using a first preset depth value as a candidate value recorded in a first index location in the sample candidate set corresponding to the current image block, and using a second preset depth value as a candidate value recorded in a second index location in the sample candidate set.

With reference to the first possible implementation manner of the first aspect, in a second possible implementation manner of the first aspect, the first preset depth value is equal to $2^{k1}$ where k1 is equal to g_bitDepthY−x1, g_bitDepthY is equal to a quantity of coded bits, the first preset depth value is less than or equal to 255, and x1 is a positive integer.

With reference to the first possible implementation manner of the first aspect or the second possible implementation manner of the first aspect, in a third possible implementation manner of the first aspect, the second preset depth value is equal to $2^{k2}$, where k2 is equal to g_bitDepthY−x2, the second preset depth value is less than or equal to 255, and x2 is a positive integer not equal to x1, or the second preset depth value is equal to the first preset depth value, or the second preset depth value is equal to a sum of the first preset depth value and the first adjustment value, or the second preset depth value is equal to a value obtained by subtracting the second adjustment value from the first preset depth value.

With reference to the first aspect, the first possible implementation manner of the first aspect, the second possible implementation manner of the first aspect, or the third possible implementation manner of the first aspect, in a fourth possible implementation manner of the first aspect, a size of the current image block is n*n, and n is a positive even number, where the first adjacent prediction sampling point and the second adjacent prediction sampling point are any two of the following adjacent prediction sampling points of the current image block an upper adjacent pixel of a pixel on an upper left corner of the current image block, a left adjacent pixel of a pixel on an upper left corner of the current image block, an upper left adjacent pixel of a pixel on an upper left corner of the current image block, or an upper adjacent pixel of the $((n+2)/2)^{th}$ pixel on an upper edge of the current image block and a left adjacent pixel of the $((n+2)/2)^{th}$ pixel on a left edge of the current image block.

With reference to the fourth possible implementation manner of the first aspect, in a fifth possible implementation manner of the first aspect, the first adjacent prediction sampling point is the upper adjacent pixel of the $((n+2)/2)^{th}$ pixel on the upper edge of the current image block, and the second adjacent prediction sampling point is the left adjacent pixel of the $((n+2)/2)^{th}$ pixel on the left edge of the current image block, or the second adjacent prediction sampling point is the upper adjacent pixel of the $((n+2)/2)^{th}$ pixel on the upper edge of the current image block, and the first adjacent prediction sampling point is the left adjacent pixel of the $((n+2)/2)^{th}$ pixel on the left edge of the current image block.

A second aspect of the present application provides a 3D video encoding method, including performing detection on a first adjacent prediction sampling point and a second adjacent prediction sampling point of a current image block in a current depth map, where available adjacent prediction sampling points of the current image block include only the first adjacent prediction sampling point and the second adjacent prediction sampling point, constructing a sample candidate set according to results of the detection on the first adjacent prediction sampling point and the second adjacent prediction sampling point, where the sample candidate set includes a first index location and a second index location, and writing, into a video bitstream, a single sample flag bit corresponding to the current image block, and writing, into the video bitstream, a single sample index flag bit corresponding to the current image block, where the single sample flag bit indicates that a decoding mode corresponding to the current image block is a SDM, and the single sample index flag bit indicates that a prediction sample value of some or all of pixels of the current image block is located in the first index location or the second index location in the sample candidate set.

With reference to the second aspect, in a first possible implementation manner, the constructing a sample candidate set according to results of the detection on the first adjacent prediction sampling point and the second adjacent prediction sampling point includes, if it is detected that the first adjacent prediction sampling point is available, and it is detected that the second adjacent prediction sampling point is available, writing a depth value of the first adjacent prediction sampling point into the first index location in the sample candidate set corresponding to the current image block, and writing a depth value of the second adjacent prediction sampling point into the second index location in the sample candidate set, or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing the depth value of the first adjacent prediction sampling point into the second index location in the sample candidate set, or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing, into the second index location in the sample candidate set, a depth value obtained by adding the depth value of the first adjacent prediction sampling point to a first adjustment value, or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing, into the second index location in the sample candidate set, a depth value obtained by subtracting a second adjustment value from the depth value of the first adjacent prediction sampling point, or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and using a second preset depth value as a candidate value recorded in the second index location in the sample candidate set, or if it is detected that the first adjacent prediction sampling point is unavailable, and it is detected that the second adjacent prediction sampling point is unavailable, using a first preset depth value as a candidate value recorded in the first index location in the sample candidate set corresponding to the current image block, and using a second preset depth value as a candidate value recorded in the second index location in the sample candidate set.

With reference to the first possible implementation manner of the second aspect, in a second possible implementation manner of the second aspect, the first preset depth value is equal to $2^{k1}$, where k1 is equal to g_bitDepthY−x1, g_bitDepthY is equal to a quantity of coded bits, the first preset depth value is less than or equal to 255, and x1 is a positive integer.

With reference to the first possible implementation manner of the second aspect or the second possible implementation manner of the second aspect, in a third possible implementation manner of the second aspect, the second preset depth value is equal to $2^{k2}$, where k2 is equal to g_bitDepthY−x2, the second preset depth value is less than or equal to 255, and x2 is a positive integer not equal to x1, or the second preset depth value is equal to the first preset depth value, or the second preset depth value is equal to a sum of the first preset depth value and the first adjustment value, or the second preset depth value is equal to a value obtained by subtracting the second adjustment value from the first preset depth value.

With reference to the second aspect, the first possible implementation manner of the second aspect, the second possible implementation manner of the second aspect, or the third possible implementation manner of the second aspect, in a fourth possible implementation manner of the second aspect, a size of the current image block is n*n, and n is a positive even number, where the first adjacent prediction sampling point and the second adjacent prediction sampling point are any two of the following adjacent prediction sampling points of the current image block: an upper adjacent pixel of a pixel on an upper left corner of the current image block, a left adjacent pixel of a pixel on an upper left corner of the current image block, an upper left adjacent pixel of a pixel on an upper left corner of the current image block, or an upper adjacent pixel of the $((n+2)/2)^{th}$ pixel on an upper edge of the current image block and a left adjacent pixel of the $((n+2)/2)^{th}$ pixel on a left edge of the current image block.

With reference to the fourth possible implementation manner of the second aspect, in a fifth possible implementation manner of the second aspect, the first adjacent prediction sampling point is the upper adjacent pixel of the $(n+2)/2)^{th}$ pixel on the upper edge of the current image block, and the second adjacent prediction sampling point is the left adjacent pixel of the $((n+2)/2)^{th}$ pixel on the left edge of the current image block, or the second adjacent prediction sampling point is the upper adjacent pixel of the $((n+2)/2)^{th}$ pixel on the upper edge of the current image block, and the first adjacent prediction sampling point is the left adjacent pixel of the $(n+2)/2)^{th}$ pixel on the left edge of the current image block.

With reference to the second aspect, the first possible implementation manner of the second aspect, the second possible implementation manner of the second aspect, the third possible implementation manner of the second aspect, the fourth possible implementation manner of the second aspect, or the fifth possible implementation manner of the second aspect, in a sixth possible implementation manner of the second aspect, before the writing, into the video bitstream, a single sample index flag bit corresponding to the current image block, the method further includes calculating, using the depth value located in the first index location in the sample candidate set, a first rate distortion cost corresponding to the current image block, and calculating, using the depth value located in the second index location in the sample candidate set, a second rate distortion cost corresponding to the current image block, where if the first rate distortion cost is less than or equal to the second rate distortion cost, the single sample index flag bit indicates that the prediction sample value of some or all of the pixels of the current image block is located in the first index location in the sample candidate set, if the first rate distortion cost is greater than the second rate distortion cost, the single sample index flag bit indicates that the prediction sample value of some or all of the pixels of the current image block is located in the second index location in the sample candidate set.

A third aspect of the present application provides a video decoding apparatus, including a decoding unit configured to decode a video bitstream to obtain a single sample flag bit corresponding to a current image block in a current depth map, a detection unit configured to perform detection on a first adjacent prediction sampling point and a second adjacent prediction sampling point of the current image block in the current depth map if the single sample flag bit obtained by decoding indicates that a decoding mode corresponding to the current image block is a SDM, where available adjacent prediction sampling points of the current image block include only the first adjacent prediction sampling point and the second adjacent prediction sampling point, a construction unit configured to construct a sample candidate set according to results of the detection on the first adjacent prediction sampling point and the second adjacent prediction sampling point, where the sample candidate set includes a first index location and a second index location, where the decoding unit is further configured to decode the video bitstream to obtain a single sample index flag bit corresponding to the current image block, and an image reconstruction unit configured to obtain, according to an index location indicated by the single sample index flag bit obtained by decoding, a candidate depth value located in the index location that is indicated by the single sample index flag bit and that is in the sample candidate set, use the candidate depth value as a prediction sample value of some or all of pixels of the current image, block, and reconstruct the current image block using the prediction sample value of some or all of the pixels of the current image block.

With reference to the third aspect, in a first possible implementation manner, the construction unit is further configured to, if it is detected that the first adjacent prediction sampling point is available, and it is detected that the second adjacent prediction sampling point is available, write a depth value of the first adjacent prediction sampling point into the first index location in the sample candidate set corresponding to the current image block, and write a depth value of the second adjacent prediction sampling point into the second index location in the sample candidate set, or the construction unit is further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and write the depth value of the first adjacent prediction sampling point into the second index location in the sample candidate set, or the construction unit is further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and write, into the second index location in the sample candidate set, a depth value obtained by adding the depth value of the first adjacent prediction sampling point to a first adjustment value, or the construction unit is further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and write, into the second index location in the sample candidate set, a depth value obtained by subtracting a second adjustment value from the depth value of the first adjacent prediction sampling point, or the construction unit is further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and use a second preset depth value as a candidate value recorded in the second index location in the sample candidate set, or the construction unit is further configured to, if it is detected that the first adjacent prediction sampling point is unavailable, and it is detected that the second adjacent prediction sampling point is unavailable, use a first preset depth value as a candidate value recorded in the first index location in the sample candidate set corresponding to the current image block, and use a second preset depth value as a candidate value recorded in the second index location in the sample candidate set.

With reference to the first possible implementation manner of the third aspect, in a second possible implementation manner of the third aspect, the first preset depth value is equal to $2^{k1}$, where k1 is equal to g_bitDepthY−x1, g_bitDepthY is equal to a quantity of coded bits, the first preset depth value is less than or equal to 255, and x1 is a positive integer.

With reference to the first possible implementation manner of the third aspect or the second possible implementation manner of the third aspect, in a third possible implementation manner of the third aspect, the second preset depth value is equal to $2^{k2}$, where k2 is equal to g_bitDepthY−x2, the second preset depth value is less than or equal to 255, and x2 is a positive integer not equal to x1, or the second preset depth value is equal to the first preset depth value, or the second preset depth value is equal to a sum of the first preset depth value and the first adjustment value, or the second preset depth value is equal to a value obtained by subtracting the second adjustment value from the first preset depth value.

With reference to the third aspect, the first possible implementation manner of the third aspect, the second possible implementation manner of the third aspect, or the third possible implementation manner of the third aspect, in a fourth possible implementation manner of the third aspect, a size of the current image block is n*n, and n is a positive even number, where the first adjacent prediction sampling point and the second adjacent prediction sampling point are any two of the following adjacent prediction sampling points of the current image block an upper adjacent pixel of a pixel on an upper left corner of the current image block, a left adjacent pixel of a pixel on an upper left corner of the current image block, an upper left adjacent pixel of a pixel on an upper left corner of the current image block, or an upper adjacent pixel of the $((n+2)/2)^{th}$ pixel on an upper edge of the current image block and a left adjacent pixel of the $((n+2)/2)^{th}$ pixel on a left edge of the current image block.

With reference to the fourth possible implementation manner of the third aspect, in a fifth possible implementation manner of the third aspect, the first adjacent prediction sampling point is the upper adjacent pixel of the $((n+2)/2)^{th}$ pixel on the upper edge of the current image block, and the second adjacent prediction sampling point is the left adjacent pixel of the $((n+2)/2)^{th}$ pixel on the left edge of the current image block, or the second adjacent prediction sampling point is the upper adjacent pixel of the $((n+2)/2)^{th}$ pixel on the upper edge of the current image block, and the first adjacent prediction sampling point is the left adjacent pixel of the $((n+2)/2)^{th}$ pixel on the left edge of the current image block.

A fourth aspect of the present application provides a video encoding apparatus, including a detection unit configured to perform detection on a first adjacent prediction sampling point and a second adjacent prediction sampling point of a current image block in a current depth map, where available adjacent prediction sampling points of the current image block include only the first adjacent prediction sampling point and the second adjacent prediction sampling point, a construction unit configured to construct a sample candidate set according to results of the detection on the first adjacent prediction sampling point and the second adjacent prediction sampling point, where the sample candidate set includes a first index location and a second index location, an encoding unit configured to write, into a video bitstream, a single sample flag bit corresponding to the current image block, and write, into the video bitstream, a single sample index flag bit corresponding to the current image block, where the single sample flag bit indicates that a decoding mode corresponding to the current image block is a SDM, and the single sample index flag bit indicates that a prediction sample value of some or all of pixels of the current image block is located in the first index location or the second index location in the sample candidate set.

With reference to the fourth aspect, in a first possible implementation manner, the construction unit is further configured to, if it is detected that the first adjacent prediction sampling point is available, and it is detected that the second adjacent prediction sampling point is available, write a depth value of the first adjacent prediction sampling point into the first index location in the sample candidate set corresponding to the current image block, and write a depth value of the second adjacent prediction sampling point into the second index location in the sample candidate set, or the construction unit is further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and write the depth value of the first adjacent prediction sampling point into the second index location in the sample candidate set, or the construction unit is further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and write, into the second index location in the sample candidate set, a depth value obtained by adding the depth value of the first adjacent prediction sampling point to a first adjustment value, or the construction unit is further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and write, into the second index location in the sample candidate set, a depth value obtained by subtracting a second adjustment value from the depth value of the first adjacent prediction sampling point, or the construction unit is further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and use a second preset depth value as a candidate value recorded in the second index location in the sample candidate set, or the construction unit is further configured to, if it is detected that the first adjacent prediction sampling point is unavailable, and it is detected that the second adjacent prediction sampling point is unavailable, use a first preset depth value as a candidate value recorded in the first index location in the sample candidate set corresponding to the current image block, and use a second preset depth value as a candidate value recorded in the second index location in the sample candidate set.

With reference to the first possible implementation manner of the fourth aspect, in a second possible implementation manner of the fourth aspect, the first preset depth value is equal to $2^{k1}$, where k1 is equal to g_bitDepthY−x1, g_bitDepthY is equal to a quantity of coded bits, the first preset depth value is less than or equal to 255, and x1 is a positive integer.

With reference to the first possible implementation manner of the fourth aspect or the second possible implementation manner of the fourth aspect, in a third possible implementation manner of the fourth aspect, the second preset depth value is equal to $2^{k2}$, where k2 is equal to g_bitDepthY−x2, the second preset depth value is less than or equal to 255, and x2 is a positive integer not equal to x1, or the second preset depth value is equal to the first preset depth value, or the second preset depth value is equal to a sum of the first preset depth value and the first adjustment value, or the second preset depth value is equal to a value obtained by subtracting the second adjustment value from the first preset depth value.

With reference to the fourth aspect, the first possible implementation manner of the fourth aspect, the second possible implementation manner of the fourth aspect, or the third possible implementation manner of the fourth aspect, in a fourth possible implementation manner of the fourth aspect, a size of the current image block is n*n, and n is a positive even number, where the first adjacent prediction sampling point and the second adjacent prediction sampling point are any two of the following adjacent prediction sampling points of the current image block an upper adjacent pixel of a pixel on an upper left corner of the current image block, a left adjacent pixel of a pixel on an upper left corner of the current image block, an upper left adjacent pixel of a pixel on an upper left corner of the current image block, or an upper adjacent pixel of the $((n+2)/2)^{th}$ pixel on an upper edge of the current image block and a left adjacent pixel of the $((n+2)/2)^{th}$ pixel on a left edge of the current image block.

With reference to the fourth possible implementation manner of the fourth aspect, in a fifth possible implementation manner of the fourth aspect, the first adjacent prediction sampling point is the upper adjacent pixel of the $((n+2)/2)^{th}$ pixel on the upper edge of the current image block, and the second adjacent prediction sampling point is the left adjacent pixel of the $((n+2)/2)^{th}$ pixel on the left edge of the current image block, or the second adjacent prediction sampling point is the upper adjacent pixel of the $((n+2)/2)^{th}$ pixel on the upper edge of the current image block, and the first adjacent prediction sampling point is the left adjacent pixel of the $((n+2)/2)^{th}$ pixel on the left edge of the current image block.

With reference to the fourth aspect, the first possible implementation manner of the fourth aspect, the second possible implementation manner of the fourth aspect, the third possible implementation manner of the fourth aspect, the fourth possible implementation manner of the fourth aspect, or the fifth possible implementation manner of the fourth aspect, in a sixth possible implementation manner of the fourth aspect, the video encoding apparatus further includes a calculation unit configured to, before the single sample index flag bit corresponding to the current image block is written into the video bitstream, calculate, using the depth value located in the first index location in the sample candidate set, a first rate distortion cost corresponding to the current image block, and calculate, using the depth value located in the second index location in the sample candidate set, a second rate distortion cost corresponding to the current image block, where if the first rate distortion cost is less than or equal to the second rate distortion cost, the single sample index flag bit indicates that the prediction sample value of some or all of the pixels of the current image block is located in the first index location in the sample candidate set, if the first rate distortion cost is greater than the second rate distortion cost, the single sample index flag bit indicates that the prediction sample value of some or all of the pixels of the current image block is located in the second index location in the sample candidate set.

It can be learned that, in encoding solutions provided in some embodiments of the present application, detection is performed on a first adjacent prediction sampling point and a second adjacent prediction sampling point of a current image block in a current depth map, a sample candidate set is constructed according to results of the detection on the first adjacent prediction sampling point and the second adjacent prediction sampling point, a single sample flag bit and a single sample index flag bit that are corresponding to the current image block are written into a video bitstream, where the single sample flag bit indicates that a decoding mode corresponding to the current image block is a SDM, and the single sample index flag bit indicates that a prediction sample value of some or all of pixels of the current image block is located in a first index location or a second index location in the sample candidate set. The sample candidate set is constructed according to the results of the detection on the two adjacent prediction sampling points, namely, the first adjacent prediction sampling point and the second adjacent prediction sampling point, where available adjacent prediction sampling points of the current image block include only the first adjacent prediction sampling point and the second adjacent prediction sampling point, that is, for the construction of the sample candidate set in the foregoing solution, reference may be made only to the results of the detection on the two adjacent prediction sampling points, which helps simplify a process of constructing the sample candidate set. It can be learned that, in comparison with a traditional solution, the foregoing solution helps reduce complexity of an SDM-based encoding algorithm and decrease a storage space occupation requirement.

It can be learned that, in decoding solutions in some embodiments of the present application, detection is performed on a first adjacent prediction sampling point and a second adjacent prediction sampling point of a current image block in a current depth map, a sample candidate set is constructed according to results of the detection on the first adjacent prediction sampling point and the second adjacent prediction sampling point, a single sample index flag bit that is corresponding to the current image block and that is in a video bitstream is decoded, a candidate depth value located in an index location that is indicated by the single sample index flag bit and that is in the sample candidate set is obtained according to the index location indicated by the single sample index flag bit obtained by decoding, the candidate depth value is used as a depth value of some or all of pixels of the current image block, and the current image block is reconstructed using the depth value of some or all of the pixels of the current image block. The sample candidate set is constructed according to the results of the detection on the two adjacent prediction sampling points, namely, the first adjacent prediction sampling point and the second adjacent prediction sampling point, where available adjacent prediction sampling points of the current image block include only the first adjacent prediction sampling point and the second adjacent prediction sampling point, that is, for the construction of the sample candidate set, reference may be made only to the results of the detection on the two adjacent prediction sampling points, which helps simplify a process of constructing the sample candidate set. In comparison with a traditional solution, the foregoing solution helps reduce complexity of an SDM-based decoding algorithm and decrease a storage space occupation requirement.

BRIEF DESCRIPTION OF DRAWINGS

To describe the technical solutions in the embodiments of the present application more clearly, the following briefly describes the accompanying drawings needed for describing the embodiments. The accompanying drawings in the following description show merely some embodiments of the present application, and persons of ordinary skill in the art may still derive other drawings from these accompanying drawings without creative efforts.

DESCRIPTION OF EMBODIMENTS

Figure 1:
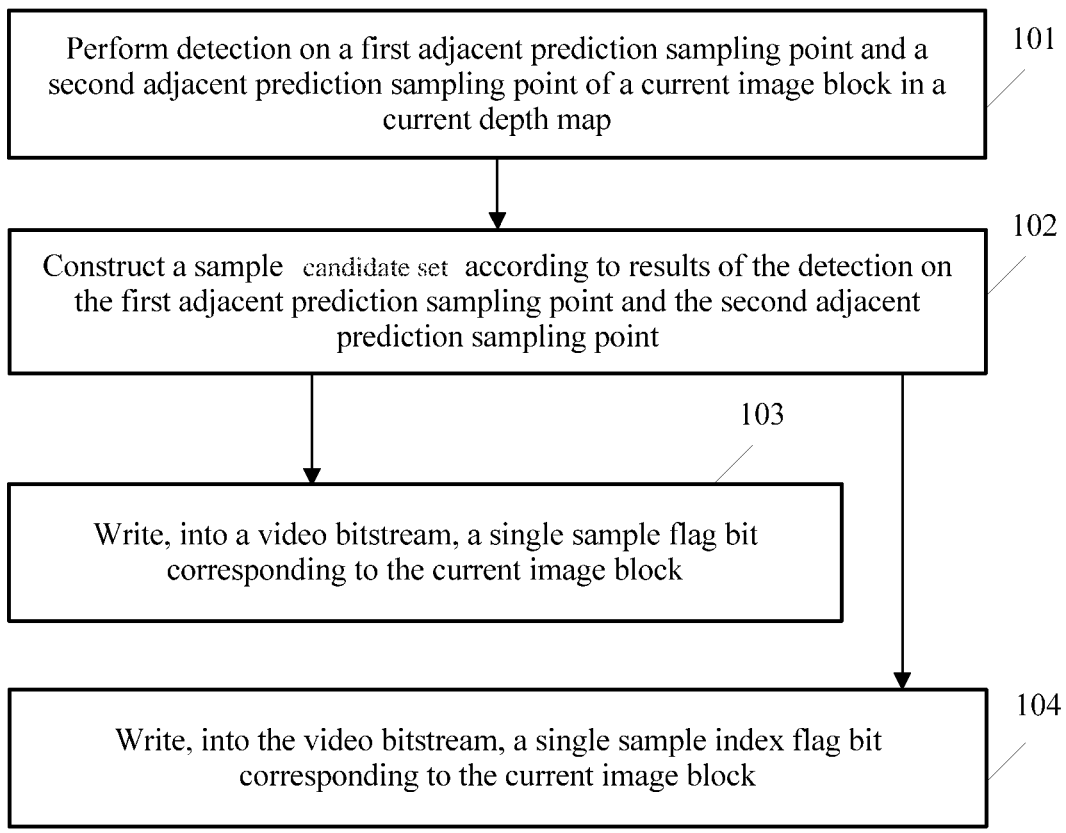
FIG. 1 is a schematic flowchart of a 3D video encoding method according to an embodiment of the present application.

Embodiments of the present application provide a 3D video encoding method, a 3D video decoding method, and a related apparatus such that complexity of an SDM-based encoding and decoding algorithm can be reduced and a storage space occupation requirement decreases.

To make persons skilled in the art understand the solutions of the present application better, the following clearly describes the technical solutions in the embodiments of the present application with reference to the accompanying drawings in the embodiments of the present application. The described embodiments are merely some but not all of the embodiments of the present application. All other embodiments obtained by persons of ordinary skill in the art based on the embodiments of the present application without creative efforts shall fall within the protection scope of the present application.

The following separately provides detailed description.

In the specification, claims, and accompanying drawings of the present application, the terms "first", "second", "third", "fourth", and so on are intended to distinguish between different objects but do not indicate a particular order. In addition, the terms "including", "comprising", and any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The following first describes a 3D video encoding method provided in the embodiments of the present application. The 3D video encoding method provided in the embodiments of the present application is executed by a video encoding apparatus. The video encoding apparatus may be any apparatus that needs to output or store a video, for example, a device such as a notebook computer, a tablet computer, a personal computer, a mobile phone, or a video server.

According to an embodiment of the 3D video encoding method of the present application, the 3D video encoding method includes performing detection on a first adjacent prediction sampling point and a second adjacent prediction sampling point of a current image block in a current depth map, constructing a sample candidate set according to results of the detection on the first adjacent prediction sampling point and the second adjacent prediction sampling point, where the sample candidate set includes a first index location and a second index location, writing, into a video bitstream, a single sample flag bit corresponding to the current image block, and writing, into the video bitstream, a single sample index flag bit corresponding to the current image block, where the single sample flag bit indicates that a decoding mode corresponding to the current image block is a SDM, and the single sample index flag bit indicates that a prediction sample value of some or all of pixels of the current image block is located in the first index location or the second index location in the sample candidate set.

First, referring to FIG. 1, FIG. 1 is a schematic flowchart of a 3D video encoding method according to an embodiment of the present application. As shown in FIG. 1, the 3D video encoding method according to this embodiment of the present application may include the following content.

101. Perform detection on a first adjacent prediction sampling point and a second adjacent prediction sampling point of a current image block in a current depth map.

Available adjacent prediction sampling points of the current image block may include only the first adjacent prediction sampling point and the second adjacent prediction sampling point.

Optionally, in some possible implementation manners of the present application, the first adjacent prediction sampling point and the second adjacent prediction sampling point are two preset adjacent prediction sampling points of the current image block. Therefore, the performing detection on a first adjacent prediction sampling point and a second adjacent prediction sampling point of a current image block in a current depth map may include performing detection on the first adjacent prediction sampling point and the second adjacent prediction sampling point that are set in the current image block in the current depth map.

Optionally, in some possible implementation manners of the present application, the performing detection on a first adjacent prediction sampling point and a second adjacent prediction sampling point of a current image block in a current depth map may include performing detection only on the first adjacent prediction sampling point and the second adjacent prediction sampling point (that are set) in the current image block in the current depth map.

102. Construct a sample candidate set according to results of the detection on the first adjacent prediction sampling point and the second adjacent prediction sampling point.

The sample candidate set may include, for example, two or more index locations. For example, the sample candidate set includes a first index location and a second index location. That is, two candidate depth values may be recorded in the sample candidate set, and one candidate depth value may be recorded in each index location. A candidate depth value located in a sample candidate set may also be referred to as a candidate sample value or a candidate value.

A data structure of the sample candidate set may be diversified, and no limitation is imposed on a specific form of the data structure of the sample candidate set in this embodiment of the present application.

103. Write, into a video bitstream, a single sample flag bit corresponding to the current image block.

The single sample flag bit indicates whether a decoding mode corresponding to the current image block is a SDM. In this embodiment of the present application, that the single sample flag bit corresponding to the current image block indicates that a decoding mode corresponding to the current image block is an SDM is mainly used as an example. For example, when the single sample flag bit is set to "0", the single sample flag bit indicates that a decoding mode corresponding to the current image block is a SDM, when the single sample flag bit is set to "1", the single sample flag bit indicates that a decoding mode corresponding to the current image block is a non-SDM. Alternatively, when the single sample flag bit is set to "0", the single sample flag bit indicates that a decoding mode corresponding to the current image block is a non-SDM, when the single sample index flag bit is set to "1", the single sample flag bit indicates that a decoding mode corresponding to the current image block is a SDM.

A core of the SDM is to simplify a process of reconstructing the current image block, and further, the current image block may be reconstructed using one depth value such that the current image block is a smooth area, and depth values of pixels in the smooth area are consistent.

104. Write, into the video bitstream, a single sample index flag bit corresponding to the current image block.

The single sample index flag bit indicates that a prediction sample value of some or all of pixels of the current image block is located in the first index location or the second index location in the sample candidate set. For example, when the single sample index flag bit is set to "0", the single sample index flag bit may indicate that a prediction sample value of some or all of pixels of the current image block is located in the first index location in the sample candidate set, when the single sample index flag bit is set to "1", the single sample index flag bit may indicate that a prediction sample value (predSample) of some or all of pixels of the current image block is located in the second index location in the sample candidate set. Alternatively, when the single sample index flag bit is set to "0", the single sample index flag bit may indicate that a prediction sample value of some or all of pixels of the current image block is located in the second index location in the sample candidate set, when the single sample index flag bit is set to "1", the single sample index flag bit may indicate that a prediction sample value of some or all of pixels of the current image block is located in the first index location in the sample candidate set. The first index location and the second index location may have a same write priority or different write priorities.

In some possible implementation processes of the present application, the single sample index flag bit and the single sample flag bit that are corresponding to the current image block may be written into the video bitstream by performing one write operation, or the single sample index flag bit and the single sample flag bit that are corresponding to the current image block may be separately written into the video bitstream by performing two write operations. That is, step 103 and step 104 may be performed simultaneously or not performed simultaneously.

It can be learned that, in the encoding solution in this embodiment, detection is performed on a first adjacent prediction sampling point and a second adjacent prediction sampling point of a current image block in a current depth map, a sample candidate set is constructed according to results of the detection on the first adjacent prediction sampling point and the second adjacent prediction sampling point, a single sample flag bit and a single sample index flag bit that are corresponding to the current image block are written into a video bitstream, where the single sample flag bit indicates that a decoding mode corresponding to the current image block is a SDM, and the single sample index flag bit indicates that a prediction sample value of some or all of pixels of the current image block is located in a first index location or a second index location in the sample candidate set. The sample candidate set is constructed according to the results of the detection on the two adjacent prediction sampling points, namely, the first adjacent prediction sampling point and the second adjacent prediction sampling point, that is, for the construction of the sample candidate set, reference may be made only to the results of the detection on the two adjacent prediction sampling points, which helps simplify a process of constructing the sample candidate set. In comparison with a traditional solution (in the traditional solution, for construction of a sample candidate set, reference is made to at least five adjacent prediction sampling points of a current image block), the foregoing solution helps reduce complexity of an SDM-based encoding algorithm and decrease a storage space occupation requirement.

An implementation manner of constructing the sample candidate set according to the results of the detection on the first adjacent prediction sampling point and the second adjacent prediction sampling point may be diversified. The first adjacent prediction sampling point and the second adjacent prediction sampling point may be detected in a same sequence or in different sequences.

For example, the constructing a sample candidate set according to results of the detection on the first adjacent prediction sampling point and the second adjacent prediction sampling point may include, if it is detected that the first adjacent prediction sampling point is available, and it is detected that the second adjacent prediction sampling point is available, writing a depth value of the first adjacent prediction sampling point into the first index location in the sample candidate set corresponding to the current image block, and writing a depth value of the second adjacent prediction sampling point into the second index location in the sample candidate set (the depth value of the first adjacent prediction sampling point and the depth value of the second adjacent prediction sampling point may be equal or unequal), or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing the depth value of the first adjacent prediction sampling point into the second index location in the sample candidate set, or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing, into the second index location in the sample candidate set, a depth value obtained by adding the depth value of the first adjacent prediction sampling point to a first adjustment value (the first adjustment value is a positive integer), or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing, into the second index location in the sample candidate set, a depth value obtained by subtracting a second adjustment value (the second adjustment value is a positive integer) from the depth value of the first adjacent prediction sampling point, or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing an invalid depth value into the second index location in the sample candidate set, or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and skipping writing any depth value into the second index location in the sample candidate set (in this case, it may be considered that only one candidate depth value is written into the sample candidate set), or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and using a second preset depth value as a candidate value recorded in the second index location in the sample candidate set (where the second preset depth value may be, for example, written into the second index location in the sample candidate set in a process of initializing the sample candidate set, and certainly, the second preset depth value may also be written into the second index location in the sample candidate set after it is detected that the second adjacent prediction sampling point is unavailable), or if it is detected that the first adjacent prediction sampling point is unavailable, and it is detected that the second adjacent prediction sampling point is unavailable, using a first preset depth value as a candidate value recorded in the first index location in the sample candidate set corresponding to the current image block (the first preset depth value may be, for example, written into the first index location in the sample candidate set in a process of initializing the sample candidate set, and certainly, the first preset depth value may also be written into the first index location in the sample candidate set after it is detected that neither the first adjacent prediction sampling point nor the second adjacent prediction sampling point is available), and using a second preset depth value as a candidate value recorded in the second index location in the sample candidate set (the second preset depth value may be, for example, written into the second index location in the sample candidate set in a process of initializing the sample candidate set, and certainly, the second preset depth value may also be written into the second index location in the sample candidate set after it is detected that neither the first adjacent prediction sampling point nor the second adjacent prediction sampling point is available).

Certainly, the sample candidate set may also be constructed in another implementation manner according to the results of the detection on the first adjacent prediction sampling point and the second adjacent prediction sampling point. Mechanisms for filling in the sample candidate set by a decoder and an encoder may be the same or similar.

It can be understood that, that an adjacent prediction sampling point (for example, the first adjacent prediction sampling point or the second adjacent prediction sampling point) of the current image block is available refers to that the adjacent prediction sampling point of the current image block can be used for intra-frame prediction, and that an adjacent prediction sampling point of the current image block is unavailable refers to that the adjacent prediction sampling point of the current image block cannot be used for intra-frame prediction.

Optionally, in some possible implementation manners of the present application, the first preset depth value is equal to $2^{k1}$, k1 is equal to g_bitDepthY−x1, g_bitDepthY is equal to a quantity of coded bits, the first preset depth value is less than or equal to 255, and x1 is a positive integer. For example, x1 may be equal to 1, 2, 3, 4, or another value. Certainly, the first preset depth value is a positive integer.

Optionally, in some possible implementation manners of the present application, the second preset depth value is equal to $2^{k2}$, k2 is equal to g_bitDepthY−x2, the second preset depth value is less than or equal to 255, and x2 is a positive integer not equal to x1. For example, x2 may be equal to 1, 2, 3, 4, or another value. Certainly, the second preset depth value is a positive integer.

Alternatively, the second preset depth value is equal to the first preset depth value, or the second preset depth value is equal to a sum of the first preset depth value and the first adjustment value, or the second preset depth value is equal to a value obtained by subtracting the second adjustment value from the first preset depth value.

Optionally, the first adjustment value may be, for example, equal to 1, 2, 3, 4, 6, 10, 20, or another value. The second adjustment value may be, for example, equal to 1, 2, 3, 4, 6, 11, 25, or another value.

Optionally, in some possible implementation manners of the present application, a size of the current image block may be, for example, n*n, and n may be a positive even number. The first adjacent prediction sampling point and the second adjacent prediction sampling point may be, for example, any two of the following adjacent prediction sampling points of the current image block an upper adjacent pixel of a pixel on an upper left corner of the current image block (a specific location is, for example, a pixel $B_0$ in FIG. 2A), a left adjacent pixel of a pixel on an upper left corner of the current image block (a specific location is, for example, a pixel $A_0$ in FIG. 2A), an upper left adjacent pixel of a pixel on an upper left corner of the current image block (a specific location is, for example, a pixel $B_{-1}$ in FIG. 2A), or an upper adjacent pixel of the $((n+2)/2)^{th}$ pixel on an upper edge of the current image block (a specific location is, for example, a pixel $B_{n/2}$ in FIG. 2A) and a left adjacent pixel of the $((n+2)/2)^{th}$ pixel on a left edge of the current image block (a specific location is, for example, a pixel $A_{n/2}$ in FIG. 2A).

Figure 2A:
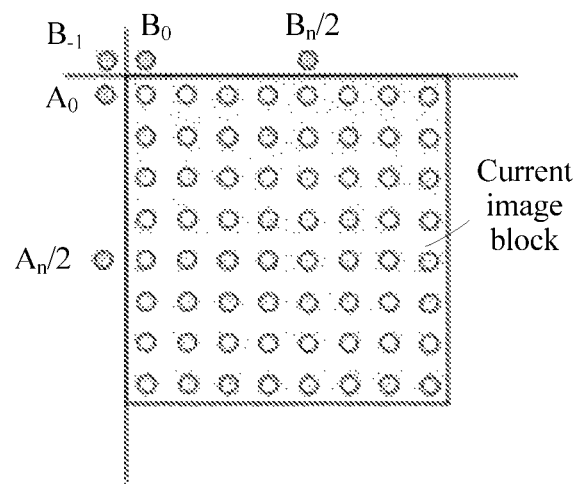
FIG. 2A is a schematic diagram of locations of adjacent prediction sampling points of a current image block according to an embodiment of the present application.

As shown in FIG. 2A, a pixel in a start location on the left of the upper edge of the current image block is the $0^{th}$ pixel $B_0$ on the upper edge, and a pixel in a start location at the top of the left edge of the current image block is the $0^{th}$ pixel $A_0$ on the left edge.

Figure 2B:
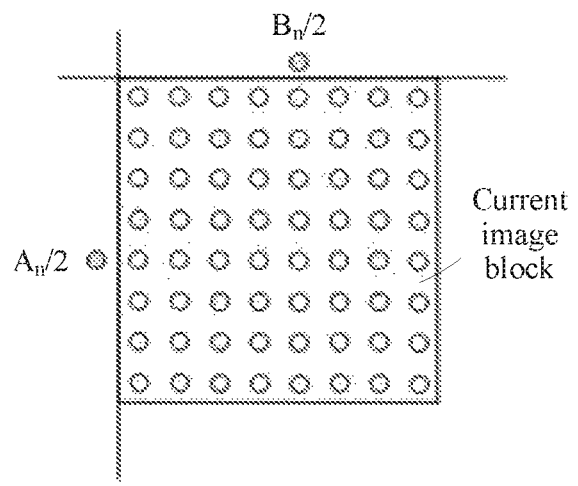
FIG. 2B is a schematic diagram of locations of adjacent prediction sampling points of another current image block according to an embodiment of the present application.

Optionally, in some possible implementation manners of the present application, as shown in FIG. 2B, the first adjacent prediction sampling point is the upper adjacent pixel $B_{n/2}$ of the $((n+2)/2)^{th}$ pixel on the upper edge of the current image block, and the second adjacent prediction sampling point is the left adjacent pixel $A_{n/2}$ of the $((n+2)/2)^{th}$ pixel on the left edge of the current image block, or the second adjacent prediction sampling point may be the upper adjacent pixel $B_{n/2}$ of the $((n+2)/2)^{th}$ pixel on the upper edge of the current image block, and the first adjacent prediction sampling point may be the left adjacent pixel $A_{n/2}$ of the $((n+2)/2)^{th}$ pixel on the left edge of the current image block.

Optionally, in some possible implementation manners of the present application, before the writing, into the video bitstream, a single sample index flag bit corresponding to the current image block, the method may further include calculating, using the depth value located in the first index location in the sample candidate set, a first rate distortion cost corresponding to the current image block, and calculating, using the depth value located in the second index location in the sample candidate set, a second rate distortion cost corresponding to the current image block, where if the first rate distortion cost is less than or equal to the second rate distortion cost, the single sample index flag bit indicates that the prediction sample value of some or all of the pixels of the current image block is located in the first index location in the sample candidate set, if the first rate distortion cost is greater than the second rate distortion cost, the single sample index flag bit indicates that the prediction sample value of some or all of the pixels of the current image block is located in the second index location in the sample candidate set.

Certainly, whether the single sample index flag bit indicates that the prediction sample value of some or all of the pixels of the current image block is located in the first index location or the second index location in the sample candidate set may also be determined in another manner. For example, when the depth value located in the first index location in the sample candidate set and the depth value located in the second index location in the sample candidate set are the same, the single sample index flag bit may indicate that the prediction sample value of some or all of the pixels of the current image block is located in either of the first index location or the second index location in the sample candidate set.

The following describes a 3D video decoding method provided in the embodiments of the present application. The 3D video decoding method provided in the embodiments of the present application is executed by a video decoding apparatus. The video decoding apparatus may be any apparatus that needs to output or store a video, for example, a device such as a notebook computer, a tablet computer, a personal computer, a mobile phone, or a video server.

According to an embodiment of the 3D video decoding method of the present application, the 3D video decoding method includes decoding a video bitstream to obtain a single sample flag bit corresponding to a current image block in a current depth map, performing detection on a first adjacent prediction sampling point and a second adjacent prediction sampling point of the current image block in the current depth map if the single sample flag bit obtained by decoding indicates that a decoding mode corresponding to the current image block is a SDM, constructing a sample candidate set according to results of the detection on the first adjacent prediction sampling point and the second adjacent prediction sampling point, decoding the video bitstream to obtain a single sample index flag bit corresponding to the current image block, obtaining, according to an index location indicated by the single sample index flag bit obtained by decoding, a candidate depth value located in the index location that is indicated by the single sample index flag bit and that is in the sample candidate set, using the candidate depth value as a prediction sample value of some or all of pixels of the current image block, and reconstructing the current image block using the prediction sample value of some or all of the pixels of the current image block.

Figure 3:
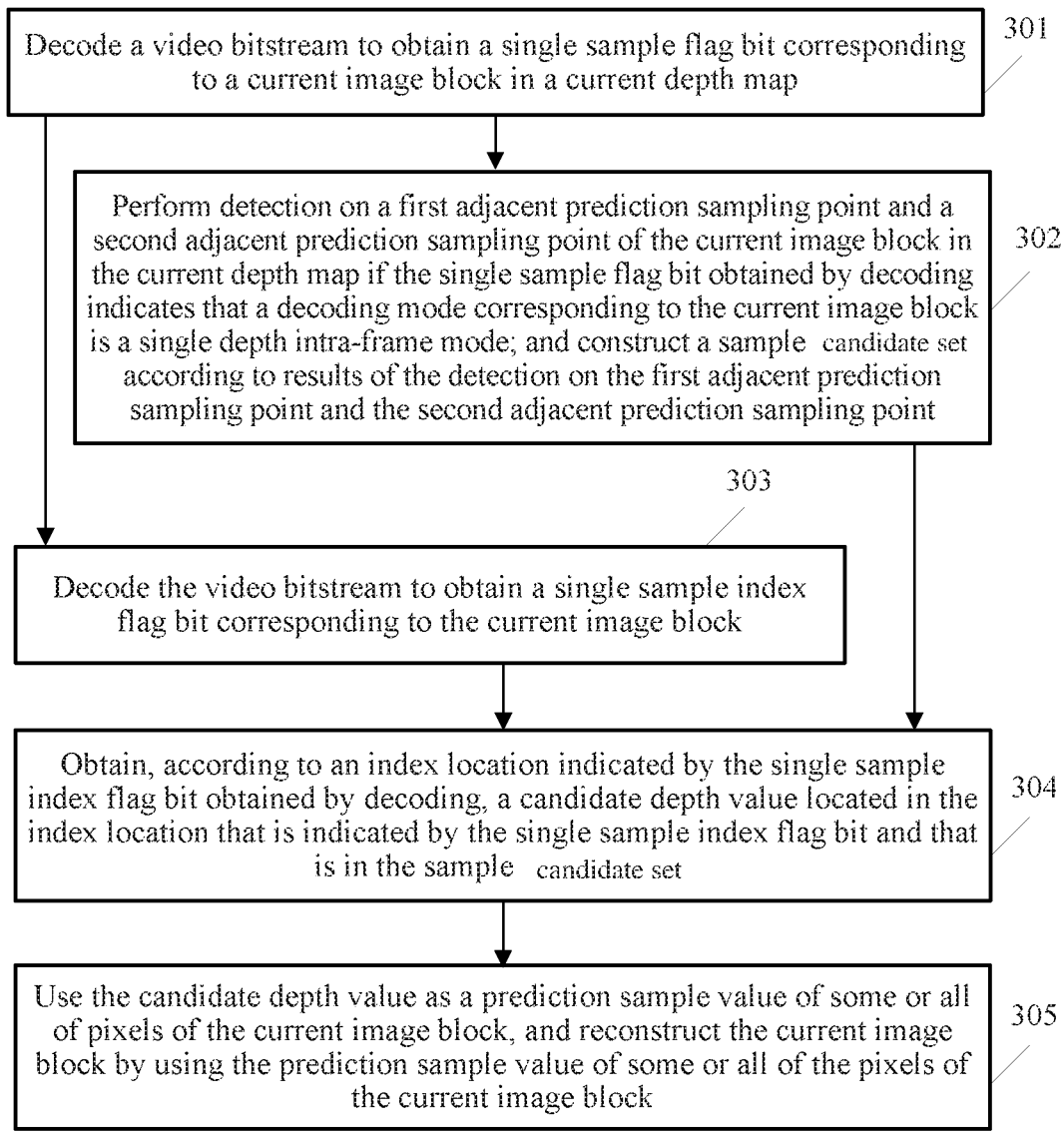
FIG. 3 is a schematic flowchart of a 3D video decoding method according to an embodiment of the present application.

Referring to FIG. 3, FIG. 3 is a schematic flowchart of a 3D video decoding method according to another embodiment of the present application. As shown in FIG. 3, the 3D video decoding method according to the other embodiment of the present application may include the following content.

301. Decode a video bitstream to obtain a single sample flag bit corresponding to a current image block in a current depth map.

302. Perform detection on a first adjacent prediction sampling point and a second adjacent prediction sampling point of the current image block in the current depth map if the single sample flag bit obtained by decoding indicates that a decoding mode corresponding to the current image block is a SDM, and construct a sample candidate set according to results of the detection on the first adjacent prediction sampling point and the second adjacent prediction sampling point.

Available adjacent prediction sampling points of the current image block may include only the first adjacent prediction sampling point and the second adjacent prediction sampling point.

Optionally, in some possible implementation manners of the present application, the first adjacent prediction sampling point and the second adjacent prediction sampling point are two preset adjacent prediction sampling points of the current image block. Therefore, the performing detection on a first adjacent prediction sampling point and a second adjacent prediction sampling point of the current image block in the current depth map may include performing detection on the first adjacent prediction sampling point and the second adjacent prediction sampling point that are set in the current image block in the current depth map.

Optionally, in some possible implementation manners of the present application, the performing detection on a first adjacent prediction sampling point and a second adjacent prediction sampling point of the current image block in the current depth map may include performing detection only on the first adjacent prediction sampling point and the second adjacent prediction sampling point (that are set) in the current image block in the current depth map.

The sample candidate set may include, for example, two or more index locations. For example, the sample candidate set includes a first index location and a second index location. That is, two candidate depth values may be recorded in the sample candidate set, and one candidate depth value may be recorded in each index location.

A data structure of the sample candidate set may be diversified, and no limitation is imposed on a specific form of the data structure of the sample candidate set in this embodiment of the present application.

The single sample flag bit indicates whether a decoding mode corresponding to the current image block is a SDM. In this embodiment of the present application, that the single sample flag bit corresponding to the current image block indicates that a decoding mode corresponding to the current image block is an SDM is mainly used as an example. For example, when the single sample flag bit is set to "0", the single sample flag bit indicates that a decoding mode corresponding to the current image block is a SDM, when the single sample index flag bit is set to "1", the single sample flag bit indicates that a decoding mode corresponding to the current image block is a non-SDM. Alternatively, when the single sample flag bit is set to "0", the single sample flag bit indicates that a decoding mode corresponding to the current image block is a non-SDM, when the single sample index flag bit is set to "1", the single sample flag bit indicates that a decoding mode corresponding to the current image block is a SDM.

303. Decode the video bitstream to obtain a single sample index flag bit corresponding to the current image block.

304. Obtain, according to an index location indicated by the single sample index flag bit obtained by decoding, a candidate depth value located in the index location that is indicated by the single sample index flag bit and that is in the sample candidate set.

In some possible implementation processes, the video bitstream may be decoded by performing one decoding operation, to obtain the single sample index flag bit and the single sample flag bit that are corresponding to the current image block, or the video bitstream may be decoded by performing two decoding operations, to separately obtain the single sample index flag bit and the single sample flag bit that are corresponding to the current image block. That is, step 301 and step 303 may be performed simultaneously or not performed simultaneously.

The single sample index flag bit indicates that a prediction sample value of some or all of pixels of the current image block is located in the first index location or the second index location in the sample candidate set. For example, when the single sample index flag bit is set to "0", the single sample index flag bit may indicate that a prediction sample value of some or all of pixels of the current image block is located in the first index location in the sample candidate set, when the single sample index flag bit is set to "1", the single sample index flag bit may indicate that a prediction sample value of some or all of pixels of the current image block is located in the second index location in the sample candidate set. Alternatively, when the single sample index flag bit is set to "0", the single sample index flag bit may indicate that a prediction sample value of some or all of pixels of the current image block is located in the second index location in the sample candidate set, when the single sample index flag bit is set to "1", the single sample index flag bit may indicate that a prediction sample value of some or all of pixels of the current image block is located in the first index location in the sample candidate set. The first index location and the second index location may have a same write priority or different write priorities (where a candidate depth value is preferentially written into an index location with a higher write priority).

305. Use the candidate depth value as a prediction sample value of some or all of pixels of the current image block, and reconstruct the current image block using the prediction sample value of some or all of the pixels of the current image block.

It can be learned that, in the decoding solution in this embodiment, detection is performed on a first adjacent prediction sampling point and a second adjacent prediction sampling point of a current image block in a current depth map, a sample candidate set is constructed according to results of the detection on the first adjacent prediction sampling paint and the second adjacent prediction sampling point, a single sample index flag bit that is corresponding to the current image block and that is in a video bitstream is decoded, a candidate depth value located in an index location that is indicated by the single sample index flag bit and that is in the sample candidate set is obtained according to the index location indicated, by the single sample index flag bit obtained by decoding, the candidate depth value is used as a depth value of some or all of pixels of the current image block, and the current image block is reconstructed using the depth value of some or all of the pixels of the current image block. The sample candidate set is constructed according to the results of the detection on the two adjacent prediction sampling points, namely, the first adjacent prediction sampling point and the second adjacent prediction sampling point, that is, for the construction of the sample candidate set, reference may be made only to the results of the detection on the two adjacent prediction sampling points, which helps simplify a process of constructing the sample candidate set. In comparison with a traditional solution, the foregoing solution helps reduce complexity of an SDM-based decoding algorithm and decrease a storage space occupation requirement.

An implementation manner of constructing the sample candidate set according to the results of the detection on the first adjacent prediction sampling point and the second adjacent prediction sampling point may be diversified. The first adjacent prediction sampling point and the second adjacent prediction sampling point may be detected in a same sequence or in different sequences.

For example, the constructing a sample candidate set according to results of the detection on the first adjacent prediction sampling point and the second adjacent prediction sampling point may include, if it is detected that the first adjacent prediction sampling point is available, and it is detected that the second adjacent prediction sampling point is available, writing a depth value of the first adjacent prediction sampling point into the first index location in the sample candidate set corresponding to the current image block, and writing a depth value of the second adjacent prediction sampling point into the second index location in the sample candidate set (the depth value of the first adjacent prediction sampling point and the depth value of the second adjacent prediction sampling point may be equal or unequal), or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing the depth value of the first adjacent prediction sampling point into the second index location in the sample candidate set, or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing, into the second index location in the sample candidate set, a depth value obtained by adding the depth value of the first adjacent prediction sampling point to a first adjustment value (the first adjustment value is a positive integer), or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing, into the second index location in the sample candidate set, a depth value obtained by subtracting a second adjustment value (the second adjustment value is a positive integer) from the depth value of the first adjacent prediction sampling point, or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing an invalid depth value into the second index location in the sample candidate set, or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and skipping writing any depth value into the second index location in the sample candidate set (in this case, it may be considered that only one candidate depth value is written into the sample candidate set), or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and using a second preset depth value as a candidate value recorded in the second index location in the sample candidate set (where the second preset depth value may be, for example, written into the second index location in the sample candidate set in a process of initializing the sample candidate set, and certainly, the second preset depth value may also be written into the second index location in the sample candidate set after it is detected that the second adjacent prediction sampling point is unavailable), or if it is detected that the first adjacent prediction sampling point is unavailable, and it is detected that the second adjacent prediction sampling point is unavailable, using a first preset depth value as a candidate value recorded in the first index location in the sample candidate set corresponding to the current image block (the first preset depth value may be, for example, written into the first index location in the sample candidate set in a process of initializing the sample candidate set, and certainly, the first preset depth value may also be written into the first index location in the sample candidate set after it is detected that neither the first adjacent prediction sampling point nor the second adjacent prediction sampling point is available), and using a second preset depth value as a candidate value recorded in the second index location in the sample candidate set (the second preset depth value may be, for example, written into the second index location in the sample candidate set in a process of initializing the sample candidate set, and certainly, the second preset depth value may also be written into the second index location in the sample candidate set after it is detected that neither the first adjacent prediction sampling point nor the second adjacent prediction sampling point is available).

Certainly, the sample candidate set may also be constructed in another implementation manner according to the results of the detection on the first adjacent prediction sampling point and the second adjacent prediction sampling point. Mechanisms for filling in the sample candidate set by a decoder and an encoder may be the same or similar.

It can be understood that, that an adjacent prediction sampling point (for example, the first adjacent prediction sampling point or the second adjacent prediction sampling point) of the current image block is available refers to that the adjacent prediction sampling point of the current image block can be used for intra-frame prediction, and that an adjacent prediction sampling point of the current image block is unavailable refers to that the adjacent prediction sampling point of the current image block cannot be used for intra-frame prediction.

Optionally, in some possible implementation manners of the present application, the first preset depth value is equal to $2^{k1}$, k1 is equal to g_bitDepthY−x1, g_bitDepthY is equal to a quantity of coded bits, the first preset depth value is less than or equal to 255, and x1 is a positive integer. For example, x1 may be equal to 1, 2, 3, 4, or another value. Certainly, the first preset depth value is a positive integer.

Optionally, in some possible implementation manners of the present application, the second preset depth value is equal to $2^{k2}$, k2 is equal to g_bitDepthY−x2, the second preset depth value is less than or equal to 255, and x2 is a positive integer not equal to x1. For example, x2 may be equal to 1, 2, 3, 4, or another value. Certainly, the second preset depth value is a positive integer.

Alternatively, the second preset depth value is equal to the first preset depth value, or the second preset depth value is equal to a sum of the first preset depth value and the first adjustment value, or the second preset depth value is equal to a value obtained by subtracting the second adjustment value from the first preset depth value.

Optionally, the first adjustment value may be, for example, equal to 1, 2, 3, 4, 6, 10, 20, or another value. The second adjustment value may be, for example, equal to 1, 2, 3, 4, 6, 11, 25, or another value.

Optionally, in some possible implementation manners of the present application, a size of the current image block may be, for example, n*n, and n may be a positive even number. The first adjacent prediction sampling point and the second adjacent prediction sampling point may be, for example, any two of the following adjacent prediction sampling points of the current image block an upper adjacent pixel of a pixel on an upper left corner of the current image block (a specific location is, for example, a pixel $B_0$ in FIG. 2A), a left adjacent pixel of a pixel on an upper left corner of the current image block (a specific location is, for example, a pixel $A_0$ in FIG. 2A), an upper left adjacent pixel of a pixel on an upper left corner of the current image block (a specific location is, for example, a pixel $B_{-1}$ in FIG. 2-a), or an upper adjacent pixel of the $((n+2)/2)^{th}$ pixel on an upper edge of the current image block (a specific location is, for example, a pixel $B_{n/2}$ in FIG. 2A) and a left adjacent pixel of the $((n+2)/2)^{th}$ pixel on a left edge of the current image block (a specific location is, for example, a pixel $A_{n/2}$ in FIG. 2A).

As shown in FIG. 2A, a pixel in a start location on the left of the upper edge of the current image block is the $0^{th}$ pixel $B_0$ on the upper edge, and a pixel in a start location at the top of the left edge of the current image block is the $0^{th}$ pixel $A_0$ on the left edge.

Optionally, in some possible implementation manners of the present application, as shown in FIG. 2B, the first adjacent prediction sampling point is the upper adjacent pixel of the $((n+2)/2)^{th}$ pixel $B_{n/2}$ on the upper edge of the current image block, and the second adjacent prediction sampling point is the left adjacent pixel of the $((n+2)/2)^{th}$ pixel $A_{n/2}$ on the left edge of the current image block, or the second adjacent prediction sampling point may be the upper adjacent pixel of the $((n+2)/2)^{th}$ pixel $B_{n/2}$ on the upper edge of the current image block, and the first adjacent prediction sampling point may be the left adjacent pixel of the $((n+2)/2)^{th}$ pixel $A_{n/2}$ on the left edge of the current image block.

For better understanding and implementation of the foregoing solutions of the embodiments of the present application, the following provides description using an example with reference to some specific application scenarios.

Figure 4:
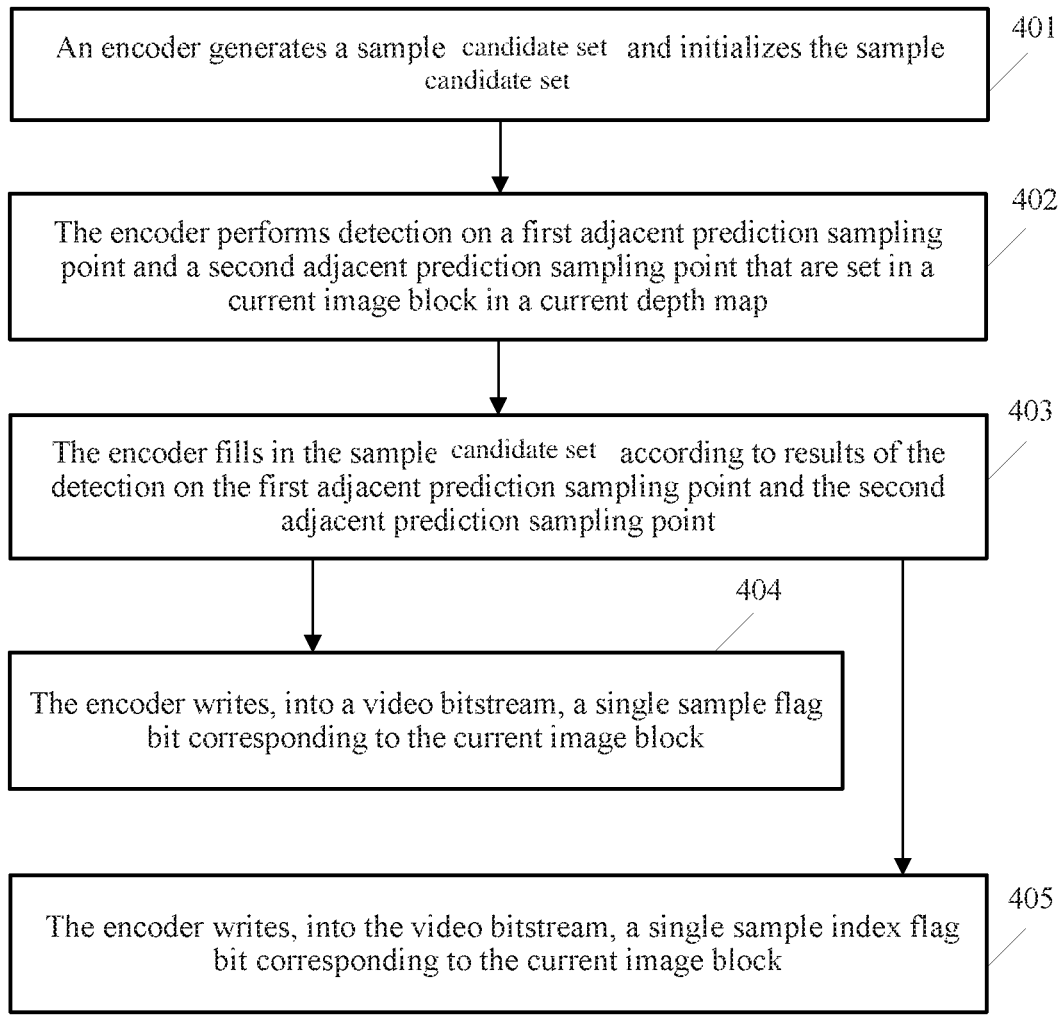
FIG. 4 is a schematic flowchart of another 3D video encoding method according to an embodiment of the present application.

Referring to FIG. 4, FIG. 4 is a schematic flowchart of another 3D video encoding method according to another embodiment of the present application. As shown in FIG. 4, the other 3D video encoding method according to the other embodiment of the present application may include the following content.

401. An encoder generates a sample candidate set and initializes the sample candidate set.

The sample candidate set may include, for example, two index locations. For example, the sample candidate set includes a first index location and a second index location. That is, two candidate depth values may be recorded in the sample candidate set, and one candidate depth value may be recorded in each index location.

Optionally, a first preset depth value may be written into the first index location in the sample candidate set in a process of initializing the sample candidate set.

Optionally, a second preset depth value may be written into the second index location in the sample candidate set in a process of initializing the sample candidate set.

402. The encoder performs detection on a first adjacent prediction sampling point and a second adjacent prediction sampling point that are set in a current image block in a current depth map.

Available adjacent prediction sampling points of the current image block may include only the first adjacent prediction sampling point and the second adjacent prediction sampling point.

The first adjacent prediction sampling point and the second adjacent prediction sampling point are preset. Therefore, it is avoided that the encoder performs detection on another adjacent prediction sampling point, except the first adjacent prediction sampling point and the second adjacent prediction sampling point, of the current image block. A quantity of adjacent prediction sampling points that need to be detected is reduced, which helps reduce algorithm complexity.

403. The encoder fills in the sample candidate set according to results of the detection on the first adjacent prediction sampling point and the second adjacent prediction sampling point.

It can be understood that when the sample candidate set is filled in according to the results of the detection on the first adjacent prediction sampling point and the second adjacent prediction sampling point, if another depth value is already written into the first index location in the sample candidate set (for example, the first preset depth value is already written into the first index location in the sample candidate set), a depth value of the first adjacent prediction sampling point may be used to overwrite the other depth value that is already written into the first index location in the sample candidate set, if no other depth value is written into the first index location in the sample candidate set, a depth value of the first adjacent prediction sampling point may be directly written into the first index location in the sample candidate set, and another index location is filled in by analogy.

An implementation manner of filling in the sample candidate set according to the results of the detection on the first adjacent prediction sampling point and the second adjacent prediction sampling point may be diversified. The first adjacent prediction sampling point and the second adjacent prediction sampling point may be detected in a same sequence or in different sequences.

For example, the filling in the sample candidate set according to results of the detection on the first adjacent prediction sampling point and the second adjacent prediction sampling point may include, if it is detected that the first adjacent prediction sampling point is available, and it is detected that the second adjacent prediction sampling point is available, writing the depth value of the first adjacent prediction sampling point into the first index location in the sample candidate set corresponding to the current image block, and writing a depth value of the second adjacent prediction sampling point into the second index location in the sample candidate set (the depth value of the first adjacent prediction sampling point and the depth value of the second adjacent prediction sampling point may be equal or unequal), or if it is detected that the first adjacent prediction sampling point is available, and it is detected that the second adjacent prediction sampling point is unavailable, writing the depth value of the first adjacent prediction sampling point into the first index location in the sample candidate set corresponding to the current image block, and writing the depth value of the first adjacent prediction sampling point into the second index location in the sample candidate set, or if it is detected that the first adjacent prediction sampling point is available, and it is detected that the second adjacent prediction sampling point is unavailable, writing the depth value of the first adjacent prediction sampling point into the first index location in the sample candidate set corresponding to the current image block, and writing, into the second index location in the sample candidate set, a depth value obtained by adding the depth value of the first adjacent prediction sampling point to a first adjustment value (the first adjustment value is a positive integer), or if it is detected that the first adjacent prediction sampling point is available, and it is detected that the second adjacent prediction sampling point is unavailable, writing the depth value of the first adjacent prediction sampling point into the first index location in the sample candidate set corresponding to the current image block, and writing, into the second index location in the sample candidate set, a depth value obtained by subtracting a second adjustment value (the second adjustment value is a positive integer) from the depth value of the first adjacent prediction sampling point, or if it is detected that the first adjacent prediction sampling point is available, and it is detected that the second adjacent prediction sampling point is unavailable, writing the depth value of the first adjacent prediction sampling point into the first index location in the sample candidate set corresponding to the current image block, and writing an invalid depth value into the second index location in the sample candidate set, or if it is detected that the first adjacent prediction sampling point is available, and it is detected that the second adjacent prediction sampling point is unavailable, writing the depth value of the first adjacent prediction sampling point into the first index location in the sample candidate set corresponding to the current image block, and skipping writing any depth value into the second index location in the sample candidate set (in this case, it may be considered that only one candidate depth value is written into the sample candidate set), or if it is detected that the first adjacent prediction sampling point is available, and it is detected that the second adjacent prediction sampling point is unavailable, writing the depth value of the first adjacent prediction sampling point into the first index location in the sample candidate set corresponding to the current image block, and using the second preset depth value as a candidate value recorded in the second index location in the sample candidate set (where the second preset depth value may be, for example, written into the second index location in the sample candidate set in a process of initializing the sample candidate set, and certainly, the second preset depth value may also be written into the second index location in the sample candidate set after it is detected that the second adjacent prediction sampling point is unavailable), or if it is detected that the first adjacent prediction sampling point is unavailable, and it is detected that the second adjacent prediction sampling point is unavailable, using the first preset depth value as a candidate value recorded in the first index location in the sample candidate set corresponding to the current image block (the first preset depth value may be, for example, written into the first index location in the sample candidate set in a process of initializing the sample candidate set, and certainly, the first preset depth value may also be written into the first index location in the sample candidate set after it is detected that neither the first adjacent prediction sampling point nor the second adjacent prediction sampling point is available), and using the second preset depth value as a candidate value recorded in the second index location in the sample candidate set (the second preset depth value may be, for example, written into the second index location in the sample candidate set in a process of initializing the sample candidate set, and certainly, the second preset depth value may also be written into the second index location in the sample candidate set after it is detected that neither the first adjacent prediction sampling point nor the second adjacent prediction sampling point is available).

Certainly, the sample candidate set may also be filled in according to the results of the detection on the first adjacent prediction sampling point and the second adjacent prediction sampling point in another implementation manner. Mechanisms for filling in the sample candidate set by a decoder and the encoder may be the same or similar.

Optionally, in some possible implementation manners of the present application, the first preset depth value is equal to $2^{k1}$, k1 is equal to g_bitDepthY−x1, g_bitDepthY is equal to a quantity of coded bits, the first preset depth value is less than or equal to 255, and x1 is a positive integer. For example, x1 may be equal to 1, 2, 3, 4, or another value. Certainly, the first preset depth value is a positive integer.

Optionally, in some possible implementation manners of the present application, the second preset depth value is equal to $2^{k2}$, k2 is equal to g_bitDepthY−x2, the second preset depth value is less than or equal to 255, and x2 is a positive integer not equal to x1. For example, x2 may be equal to 1, 2, 3, 4, or another value. Certainly, the second preset depth value is a positive integer.

Alternatively, the second preset depth value is equal to the first preset depth value, or the second preset depth value is equal to a sum of the first preset depth value and the first adjustment value, or the second preset depth value is equal to a value obtained by subtracting the second adjustment value from the first preset depth value.

Optionally, the first adjustment value may be, for example, equal to 1, 2, 3, 4, 6, 10, 20, or another value. The second adjustment value may be, for example, equal to 1, 2, 3, 4, 6, 11, 25, or another value.

Optionally, in some possible implementation manners of the present application, a size of the current image block may be, for example, n*n, and n may be a positive even number. The first adjacent prediction sampling point and the second adjacent prediction sampling point may be, for example, any two of the following adjacent prediction sampling points of the current image block an upper adjacent pixel of a pixel on an upper left corner of the current image block, a left adjacent pixel of a pixel on an upper left corner of the current image block, an upper left adjacent pixel of a pixel on an upper left corner of the current image block, or an upper adjacent pixel of the $((n+2)/2)^{th}$ pixel on an upper edge of the current image block and a left adjacent pixel of the $((n+2)/2)^{th}$ pixel on a left edge of the current image block.

Optionally, in some possible implementation manners of the present application, the first adjacent prediction sampling point is the upper adjacent pixel of the $((n+2)/2)^{th}$ pixel on the upper edge of the current image block, and the second adjacent prediction sampling point is the left adjacent pixel of the $((n+2)/2)^{th}$ pixel on the left edge of the current image block, or the second adjacent prediction sampling point may be the upper adjacent pixel of the $((n+2)/2)^{th}$ pixel on the upper edge of the current image block, and the first adjacent prediction sampling point may be the left adjacent pixel of the $((n+2)/2)^{th}$ pixel on the left edge of the current image block.

Optionally, in some possible implementation manners of the present application, before writing, into a video bitstream, a single sample index flag bit corresponding to the current image block, the method may further include, if the depth value located in the first index location in the sample candidate set and the depth value located in the second index location in the sample candidate set are different, calculating, using the depth value located in the first index location in the sample candidate set, a first rate distortion cost corresponding to the current image block, and calculating, using the depth value located in the second index location in the sample candidate set, a second rate distortion cost corresponding to the current image block, where if the first rate distortion cost is less than or equal to the second rate distortion cost, the single sample index flag bit indicates that a prediction sample value of some or all of pixels of the current image block is located in the first index location in the sample candidate set, if the first rate distortion cost is greater than the second rate distortion cost, the single sample index flag bit indicates that a prediction sample value of some or A of pixels of the current image block is located in the second index location in the sample candidate set.

It can be understood that the construction of the sample candidate set may include steps such as generating the sample candidate set and filling in the sample candidate set. Alternatively, the construction of the sample candidate set may include steps such as generating the sample candidate set, initializing the sample candidate set, and filling in the sample candidate set. Therefore, step 401 and step 403 may be taken as some specific implementation manners of constructing the sample candidate set according to the results of the detection on the first adjacent prediction sampling point and the second adjacent prediction sampling point. Certainly, if the sample candidate set already exists, the step of generating the sample candidate set may be omitted.

404. The encoder writes, into a video bitstream, a single sample flag bit corresponding to the current image block.

The single sample flag bit indicates that a decoding mode corresponding to the current image block is a SDM. For example, when the single sample flag bit is set to "0", the single sample flag bit indicates that a decoding mode corresponding to the current image block is a SDM, when the single sample index flag bit is set to "1", the single sample flag bit indicates that a decoding mode corresponding to the current image block is a non-SDM. Alternatively, when the single sample flag hit is set to "0", the single sample flag bit indicates that a decoding mode corresponding to the current image block is a non-SDM, when the single sample index flag bit is set to "1", the single sample flag bit indicates that a decoding mode corresponding to the current image block is a SDM.

405. The encoder writes, into the video bitstream, a single sample index flag hit corresponding to the current image block.

The single sample index flag bit indicates that a prediction sample value of some or all of pixels of the current image block is located in the first index location or the second index location in the sample candidate set. For example, when the single sample index flag bit is set to "0", the single sample index flag bit may indicate that a prediction sample value of some or all of pixels of the current image block is located in the first index location in the sample candidate set, when the single sample index flag bit is set to "1", the single sample index flag bit may indicate that a prediction sample value of some or all of pixels of the current image block is located in the second index location in the sample candidate set. Alternatively, when the single sample index flag bit is set to "0", the single sample index flag bit may indicate that a prediction sample value of some or all of pixels of the current image block is located in the second index location in the sample candidate set, when the single sample index flag bit is set to "1", the single sample index flag bit may indicate that a prediction sample value of some or all of pixels of the current image block is located in the first index location in the sample candidate set. The first index location and the second index location may have a same write priority or different write priorities.

In some possible implementation processes of the present application, the single sample index flag bit and the single sample flag bit that are corresponding to the current image block may be written into the video bitstream by performing one write operation, or the single sample index flag bit and the single sample flag bit that are corresponding to the current image block may be separately written into the video bitstream by performing two write operations. That is, step 404 and step 405 may be performed simultaneously or not performed simultaneously.

It can be learned that, in the encoding solution in this embodiment, detection is performed on a first adjacent prediction sampling point and a second adjacent prediction sampling point of a current image block in a current depth map, a sample candidate set is constructed according to results of the detection on the first adjacent prediction sampling point and the second adjacent prediction sampling point, a single sample flag bit and a single sample index flag bit that are corresponding to the current image block are written into a video bitstream, where the single sample flag bit indicates that a decoding mode corresponding to the current image block is a SDM, and the single sample index flag bit indicates that a prediction sample value of some or all of pixels of the current image block is located in a first index location or a second index location in the sample candidate set. The sample candidate set is constructed according to the results of the detection on the first adjacent prediction sampling point and the second adjacent prediction sampling point, that is, for the construction of the sample candidate set, reference may be made only to the results of the detection on the two adjacent prediction sampling points. In comparison with a traditional solution, the foregoing solution helps reduce complexity of an SDM-based encoding algorithm and decrease a storage space occupation requirement.

Figure 5:
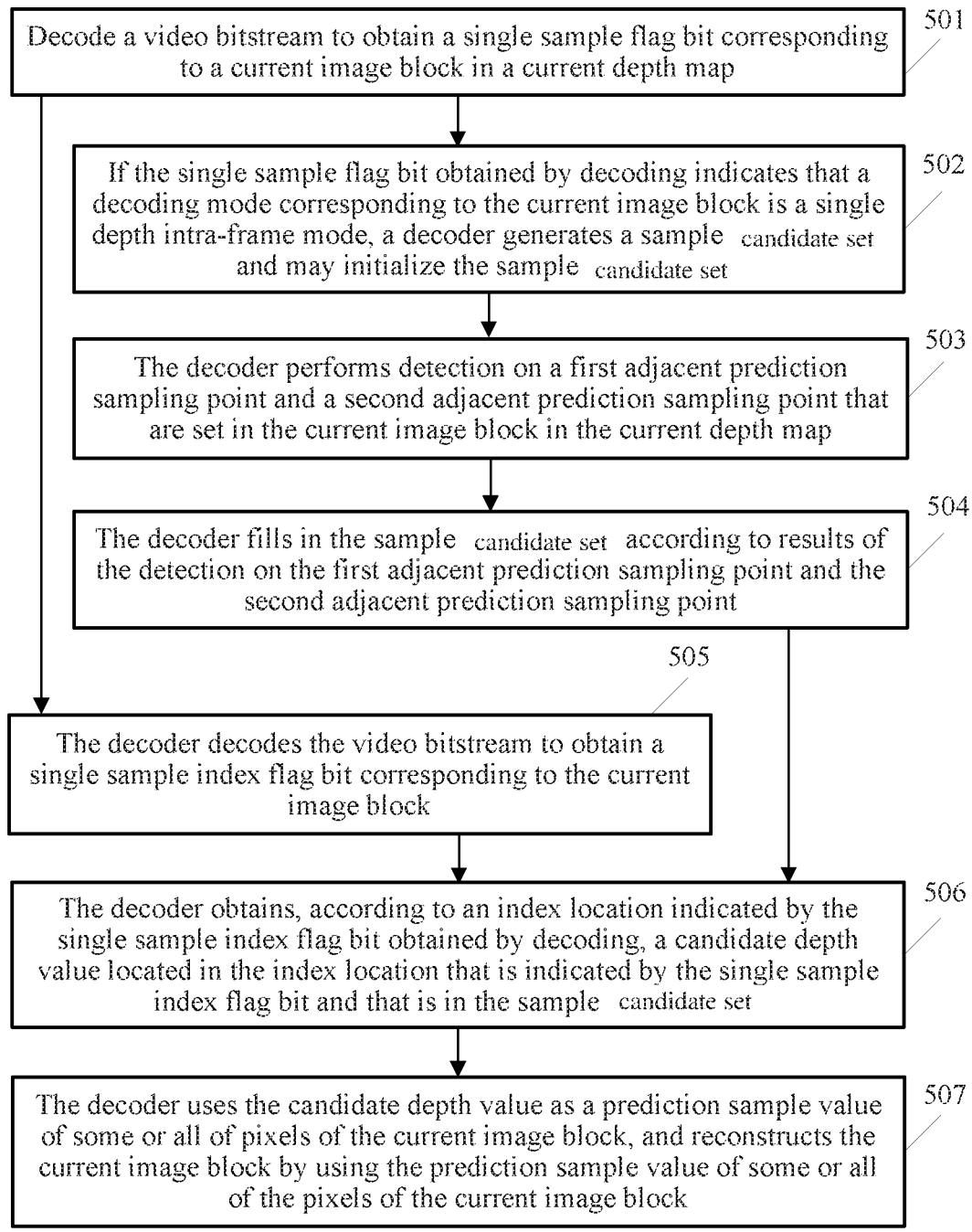
FIG. 5 is a schematic flowchart of another 3D video decoding method according to an embodiment of the present application.

First, referring to FIG. 5, FIG. 5 is a schematic flowchart of a 3D video decoding method according to another embodiment of the present application. As shown in FIG. 5, the 3D video decoding method according to the other embodiment of the present application may include the following content

501. A decoder decodes a video bitstream to obtain a single sample flag bit corresponding to a current image block in a current depth map.

502. If the single sample flag bit obtained by decoding indicates that a decoding mode corresponding to the current image block is a SDM, the decoder generates a sample candidate set and may initialize the sample candidate set.

The sample candidate set may include, for example, two index locations. For example, the sample candidate set includes a first index location and a second index location. That is, two candidate depth values may be recorded in the sample candidate set, and one candidate depth value may be recorded in each index location.

Optionally, a first preset depth value may be written into the first index location in the sample candidate set in a process of initializing the sample candidate set.

Optionally, a second preset depth value may be written into the second index location in the sample candidate set in a process of initializing the sample candidate set.

503. The decoder performs detection on a first adjacent prediction sampling point and a second adjacent prediction sampling point that are set in the current image block in the current depth map.

Available adjacent prediction sampling points of the current image block may include only the first adjacent prediction sampling point and the second adjacent prediction sampling point.

The first adjacent prediction sampling point and the second adjacent prediction sampling point are preset. Therefore, it is avoided that the decoder performs detection on another adjacent prediction sampling point, except the first adjacent prediction sampling point and the second adjacent prediction sampling point, of the current image block. A quantity of adjacent prediction sampling points that need to be detected by the decoder is reduced, which helps further reduce algorithm complexity.

504. The decoder fills in the sample candidate set according to results of the detection on the first adjacent prediction sampling point and the second adjacent prediction sampling point.

It can be understood that when the sample candidate set is filled in according to the results of the detection on the first adjacent prediction sampling point and the second adjacent prediction sampling point, if another depth value is already written into the first index location in the sample candidate set (for example, the first preset depth value is already written into the first index location in the sample candidate set), a depth value of the first adjacent prediction sampling point may be used to overwrite the other depth value that is already written into the first index location in the sample candidate set, if no other depth value is written into the first index location in the sample candidate set, a depth value of the first adjacent prediction sampling point may be directly written into the first index location in the sample candidate set, and another index location is filled in by analogy.

If it is detected that the first adjacent prediction sampling point is available, and it is detected that the second adjacent prediction sampling point is available, the depth value of the first adjacent prediction sampling point is written into the first index location in the sample candidate set corresponding to the current image block, and a depth value of the second adjacent prediction sampling point is written into the second index location in the sample candidate set (the depth value of the first adjacent prediction sampling point and the depth value of the second adjacent prediction sampling point may be equal or unequal), or if it is detected that the first adjacent prediction sampling point is available, and it is detected that the second adjacent prediction sampling point is unavailable, the depth value of the first adjacent prediction sampling point is written into the first index location in the sample candidate set corresponding to the current image block, and the depth value of the first adjacent prediction sampling point is written into the second index location in the sample candidate set, or if it is detected that the first adjacent prediction sampling point is available, and it is detected that the second adjacent prediction sampling point is unavailable, the depth value of the first adjacent prediction sampling point is written into the first index location in the sample candidate set corresponding to the current image block, and a depth value obtained by adding the depth value of the first adjacent prediction sampling point to a first adjustment value (the first adjustment value is a positive integer) is written into the second index location in the sample candidate set, or if it is detected that the first adjacent prediction sampling point is available, and it is detected that the second adjacent prediction sampling point is unavailable, the depth value of the first adjacent prediction sampling point is written into the first index location in the sample candidate set corresponding to the current image block, and a depth value obtained by subtracting a second adjustment value (the second adjustment value is a positive integer) from the depth value of the first adjacent prediction sampling point is written into the second index location in the sample candidate set, or if it is detected that the first adjacent prediction sampling point is available, and it is detected that the second adjacent prediction sampling point is unavailable, the depth value of the first adjacent prediction sampling point is written into the first index location in the sample candidate set corresponding to the current image block, and an invalid depth value is written into the second index location in the sample candidate set, or if it is detected that the first adjacent prediction sampling point is available, and it is detected that the second adjacent prediction sampling point is unavailable, the depth value of the first adjacent prediction sampling point is written into the first index location in the sample candidate set corresponding to the current image block, and no depth value is written into the second index location in the sample candidate set (in this case, it may be considered that only one candidate depth value is written into the sample candidate set), or if it is detected that the first adjacent prediction sampling point is available, and it is detected that the second adjacent prediction sampling point is unavailable, the depth value of the first adjacent prediction sampling point is written into the first index location in the sample candidate set corresponding to the current image block, and the second preset depth value is used as a candidate value recorded in the second index location in the sample candidate set (where the second preset depth value may be, for example, written into the second index location in the sample candidate set in a process of initializing the sample candidate set, and certainly, the second preset depth value may also be written into the second index location in the sample candidate set after it is detected that the second adjacent prediction sampling point is unavailable), or if it is detected that the first adjacent prediction sampling point is unavailable, and it is detected that the second adjacent prediction sampling point is unavailable, the first preset depth value is used as a candidate value recorded in the first index location in the sample candidate set corresponding to the current image block (the first preset depth value may be, for example, written into the first index location in the sample candidate set in a process of initializing the sample candidate set, and certainly, the first preset depth value may also be written into the first index location in the sample candidate set after it is detected that neither the first adjacent prediction sampling point nor the second adjacent prediction sampling point is available), and the second preset depth value is used as a candidate value recorded in the second index location in the sample candidate set (the second preset depth value may be, for example, written into the second index location in the sample candidate set in a process of initializing the sample candidate set, and certainly, the second preset depth value may also be written into the second index location in the sample candidate set after it is detected that neither the first adjacent prediction sampling point nor the second adjacent prediction sampling point is available).

Certainly, the sample candidate set may also be filled in according to the results of the detection on the first adjacent prediction sampling point and the second adjacent prediction sampling point in another implementation manner. Mechanisms for filling in the sample candidate set by the decoder and an encoder may be the same or similar.

Optionally, in some possible implementation manners of the present application, the first preset depth value is equal to $2^{k1}$, k1 is equal to g_bitDepthY−x1, g_bitDepthY is equal to a quantity of coded bits, the first preset depth value is less than or equal to 255, and x1 is a positive integer. For example, x1 may be equal to 1, 2, 3, 4, or another value. Certainly, the first preset depth value is a positive integer.

Optionally, in some possible implementation manners of the present application, the second preset depth value is equal to $2^{k2}$, k2 is equal to g_bitDepthY−x2, the second preset depth value is less than or equal to 255, and x2 is a positive integer not equal to x1. For example, x2 may be equal to 1, 2, 3, 4, or another value. Certainly, the second preset depth value is a positive integer.

Alternatively, the second preset depth value is equal to the first preset depth value, or the second preset depth value is equal to a sum of the first preset depth value and the first adjustment value, or the second preset depth value is equal to a value obtained by subtracting the second adjustment value from the first preset depth value.

Optionally, the first adjustment value may be, for example, equal to 1, 2, 3, 4, 6, 10, 20, or another value. The second adjustment value may be, for example, equal to 1, 2, 3, 4, 6, 11, 25, or another value.

Optionally, in some possible implementation manners of the present application, a size of the current image block may be, for example, n*n, and n may be a positive even number. The first adjacent prediction sampling point and the second adjacent prediction sampling point may be, for example, any two of the following adjacent prediction sampling points of the current image block an upper adjacent pixel of a pixel on an upper left corner of the current image block, a left adjacent pixel of a pixel on an upper left corner of the current image block, an upper left adjacent pixel of a pixel on an upper left corner of the current image block, or an upper adjacent pixel of the $((n+2)/2)^{th}$ pixel on an upper edge of the current image block and a left adjacent pixel of the $((n+2)/2)^{th}$ pixel on a left edge of the current image block.

Optionally, in some possible implementation manners of the present application, the first adjacent prediction sampling point is the upper adjacent pixel of the $((n+2)/2)^{th}$ pixel on the upper edge of the current image block, and the second adjacent prediction sampling point is the left adjacent pixel of the $((n+2)/2)^{th}$ pixel on the left edge of the current image block, or the second adjacent prediction sampling point may be the upper adjacent pixel of the $((n+2)/2)^{th}$ pixel on the upper edge of the current image block, and the first adjacent prediction sampling point may be the left adjacent pixel of the $((n+2)/2)^{th}$ pixel on the left edge of the current image block.

Optionally, in some possible implementation manners of the present application, if the depth value located in the first index location in the sample candidate set and the depth value located in the second index location in the sample candidate set are different, the encoder may calculate, using the depth value located in the first index location in the sample candidate set, a first rate distortion cost corresponding to the current image block, and calculate, using the depth value located in the second index location in the sample candidate set, a second rate distortion cost corresponding to the current image block. If the first rate distortion cost is less than or equal to the second rate distortion cost, the single sample index flag bit indicates that a prediction sample value of some or all of pixels of the current image block is located in the first index location in the sample candidate set, if the first rate distortion cost is greater than the second rate distortion cost, the single sample index flag bit indicates that a prediction sample value of some or all of pixels of the current image block is located in the second index location in the sample candidate set.

It can be understood that the construction of the sample candidate set may include steps such as generating the sample candidate set and filling in the sample candidate set. Alternatively, the construction of the sample candidate set may include steps such as generating the sample candidate set, initializing the sample candidate set, and filling in the sample candidate set. Therefore, step 502 and step 504 may be taken as some specific implementation manners of constructing the sample candidate set according to the results of the detection on the first adjacent prediction sampling point and the second adjacent prediction sampling point. Certainly, if the sample candidate set already exists, the step of generating the sample candidate set may be omitted.

505. The decoder decodes the video bitstream to obtain a single sample index flag bit corresponding to the current image block.

The single sample flag bit indicates that a decoding mode corresponding to the current image block is a SDM. For example, when the single sample flag bit is set to "0", the single sample flag bit indicates that a decoding mode corresponding to the current image block is a SDM, when the single sample index flag bit is set to "1", the single sample flag bit indicates that a decoding mode corresponding to the current image block is a non-SDM. Alternatively, when the single sample flag bit is set to "0", the single sample flag bit indicates that a decoding mode corresponding to the current image block is a non-SDM, when the single sample index flag bit is set to "1", the single sample flag bit indicates that a decoding mode corresponding to the current image block is a SDM.

506. The decoder obtains, according to an index location indicated by the single sample index flag bit obtained by decoding, a candidate depth value located in the index location that is indicated by the single sample index flag bit and that is in the sample candidate set.

507. The decoder uses the candidate depth value as a prediction sample value of some or all of pixels of the current image block, and reconstructs the current image block using the prediction sample value of some or all of the pixels of the current image block.

The single sample index flag bit indicates that a prediction sample value of some or all of pixels of the current image block is located in the first index location or the second index location in the sample candidate set. For example, when the single sample index flag bit is set to "0", the single sample index flag bit may indicate that a prediction sample value of some or all of pixels of the current image block is located in the first index location in the sample candidate set, when the single sample index flag bit is set to "1", the single sample index flag bit may indicate that a prediction sample value of some or all of pixels of the current image block is located in the second index location in the sample candidate set. Alternatively, when the single sample index flag bit is set to "0", the single sample index flag bit may indicate that a prediction sample value of some or all of pixels of the current image block is located in the second index location in the sample candidate set, when the single sample index flag hit is set to "1", the single sample index flag bit may indicate that a prediction sample value of some or all of pixels of the current image block is located in the first index location in the sample candidate set. The first index location and the second index location may have a same write priority or different write priorities.

It can be learned that, in the decoding solution in this embodiment, detection is performed on a first adjacent prediction sampling point and a second adjacent prediction sampling point of a current image block in a current depth map, a sample candidate set is constructed according to results of the detection on the first adjacent prediction sampling point and the second adjacent prediction sampling point, a single sample index flag bit that is corresponding to the current image block and that is in a video bitstream is decoded, a candidate depth value located in an index location that is indicated by the single sample index flag bit and that is in the sample candidate set is obtained according to the index location indicated by the single sample index flag bit obtained by decoding, the candidate depth value is used as a depth value of some or all of pixels of the current image block, and the current image block is reconstructed using the depth value of some or all of the pixels of the current image block. The sample candidate set is constructed according to the results of the detection on the first adjacent prediction sampling point and the second adjacent prediction sampling point, that is, for the construction of the sample candidate set, reference may be made only to the results of the detection on the two adjacent prediction sampling points. In comparison with a traditional solution, the foregoing solution helps reduce complexity of an SDM-based decoding algorithm and decrease a storage space occupation requirement.

The following provides description using some more specific examples.

Example 1: The current image block is an image block of an 8×8 size in the depth map, the decoding mode corresponding to the current image block is the SDM, the depth value of the first adjacent prediction sampling point of the current image block is 37, and the depth value of the second adjacent prediction sampling point of the current image block is 39. Therefore, the encoder and the decoder write the depth value 37 of the first adjacent prediction sampling point into the first index location in the sample candidate set, and write the depth value 39 of the second adjacent prediction sampling point into the second index location in the sample candidate set. The encoder may calculate, using the depth value 37 located in the first index location in the sample candidate set, the first rate distortion cost corresponding to the current image block, and the encoder may calculate, using the depth value 39 located in the second index location in the sample candidate set, the second rate distortion cost corresponding to the current image block. It is assumed that the first rate distortion cost is greater than the second rate distortion cost, and therefore, the encoder may set both the single sample flag bit and the single sample index flag bit that are corresponding to the current image block to "1", to indicate that the decoding mode of the current image block is the SDM, and the prediction sample value of some or all of the pixels of the current image block is located in the second index location in the sample candidate set. The decoder may determine, according to a value of the single sample index flag bit that is obtained by decoding the video bitstream, that the prediction sample value of some or all of the pixels of the current image block is located in the second index location in the sample candidate set, and then may obtain the candidate depth value 39 located in the second index location in the sample candidate set, use the candidate depth value 39 as the prediction sample value of some or all of the pixels of the current image block, and reconstruct the current image block using the depth value of some or all of the pixels of the current image block.

Example 2: The current image block is an image block of an 8×8 size in the depth map, the decoding mode corresponding to the current image block is the SDM, the depth value of the first adjacent prediction sampling point of the current image block is 37, and the second adjacent prediction sampling point of the current image block is unavailable. Therefore, the encoder and the decoder write the depth value 37 of the first adjacent prediction sampling point into the first index location in the sample candidate set, and write a depth value 38 (38=37+1, where 1 is an adjustment value) into the second index location in the sample candidate set. The encoder may calculate, using the depth value 37 located in the first index location in the sample candidate set, the first rate distortion cost corresponding to the current image block, and the encoder may calculate, using the depth value 38 located in the second index location in the sample candidate set, the second rate distortion cost corresponding to the current image block. It is assumed that the first rate distortion cost is greater than the second rate distortion cost, and therefore, the encoder may set both the single sample flag bit and the single sample index flag bit that are corresponding to the current image block to "1", to indicate that the decoding mode of the current image block is the SDM, and the prediction sample value of some or all of the pixels of the current image block is located in the second index location in the sample candidate set. The decoder may determine, according to a value of the single sample index flag bit that is obtained by decoding the video bitstream, that the prediction sample value of some or all of the pixels of the current image block is located in the second index location in the sample candidate set, and then may obtain the candidate depth value 38 located in the second index location in the sample candidate set, use the candidate depth value 38 as the prediction sample value of some or all of the pixels of the current image block, and reconstruct the current image block using the depth value of some or all of the pixels of the current image block.

Example 3: The current image block is an image block of an 8×8 size in the depth map, the decoding mode corresponding to the current image block is the SDM, the depth value of the first adjacent prediction sampling point of the current image block is 37, and the second adjacent prediction sampling point of the current image block is unavailable. Therefore, the encoder and the decoder write the depth value 37 of the first adjacent prediction sampling point into the first index location in the sample candidate set, and write a depth value 38 (38=37+1, where 1 is an adjustment value) into the second index location in the sample candidate set. The encoder may calculate, using the depth value 37 located in the first index location in the sample candidate set, the first rate distortion cost corresponding to the current image block, and the encoder may calculate, using the depth value 38 located in the second index location in the sample candidate set, the second rate distortion cost corresponding to the current image block. It is assumed that the first rate distortion cost is less than the second rate distortion cost, and therefore, the encoder may set the single sample flag bit corresponding to the current image block to "1", to indicate that the decoding mode of the current image block is the SDM, and set the single sample index flag bit to "0", to indicate that a depth value of some or all of the pixels of the current image block is located in the first index location in the sample candidate set. Correspondingly, the decoder determines, according to a value of the single sample index flag bit that is obtained by decoding the video bitstream, that the prediction sample value of some or all of the pixels of the current image block is located in the first index location in the sample candidate set, and then obtains the candidate depth value 37 located in the first index location in the sample candidate set, uses the candidate depth value 37 as the prediction sample value of some or all of the pixels of the current image block, and reconstructs the current image block using the depth value of some or all of the pixels of the current image block.

Example 4: The current image block is an image block of an 8×8 size in the depth map, the decoding mode corresponding to the current image block is the SDM, the depth value of the first adjacent prediction sampling point of the current image block is 37, and the second adjacent prediction sampling point of the current image block is unavailable. Therefore, the encoder and the decoder write the depth value 37 of the first adjacent prediction sampling point into the first index location in the sample candidate set, and write the depth value 37 of the first adjacent prediction sampling point into the second index location in the sample candidate set. Therefore, the encoder may set the single sample flag bit corresponding to the current image block to "1", to indicate that the decoding mode of the current image block is the SDM, and set the single sample index flag bit to "0", to indicate that a depth value of some or all of the pixels of the current image block is located in the first index location in the sample candidate set. Correspondingly, the decoder determines, according to a value of the single sample index flag bit that is obtained by decoding the video bitstream, that the prediction sample value of some or all of the pixels of the current image block is located in the first index location in the sample candidate set, and then may obtain the candidate depth value 37 located in the first index location in the sample candidate set, uses the candidate depth value 37 as the prediction sample value of some or all of the pixels of the current image block, and reconstructs the current image block using the depth value of some or all of the pixels of the current image block.

Example 5: The current image block is an image block of an 8×8 size in the depth map, the decoding mode corresponding to the current image block is the SDM, the depth value of the first adjacent prediction sampling point of the current image block is 37, and the second adjacent prediction sampling point of the current image block is unavailable. Therefore, the encoder and the decoder write the depth value 37 of the first adjacent prediction sampling point into the first index location in the sample candidate set, and may skip writing any depth value into the second index location in the sample candidate set, that is, use a single candidate mode for the sample candidate set. Therefore, the encoder may set the single sample flag bit corresponding to the current image block to "1", to indicate that the decoding mode of the current image block is the SDM, and set the single sample index flag bit to "0", to indicate that a depth value of some or all of the pixels of the current image block is located in the first index location in the sample candidate set. Correspondingly, the decoder determines, according to a value of the single sample index flag bit that is obtained by decoding the video bitstream, that the prediction sample value of some or all of the pixels of the current image block is located in the first index location in the sample candidate set, and then may obtain the candidate depth value 37 located in the first index location in the sample candidate set, uses the candidate depth value 37 as the prediction sample value of some or all of the pixels of the current image block, and reconstructs the current image block using the depth value of some or all of the pixels of the current image block.

Example 6: The current image block is an image block of an 8×8 size in the depth map, the decoding mode corresponding to the current image block is the SDM, and neither the first adjacent prediction sampling point nor the second adjacent prediction sampling point of the current image block is available. Therefore, the encoder and the decoder write a first preset depth value $2^{k1}$ into the first index location in the sample candidate set, and may skip writing any depth value into the second index location in the sample candidate set, that is, use a single candidate mode for the sample candidate set. Therefore, the encoder may set the single sample flag bit corresponding to the current image block to "1", to indicate that the decoding mode of the current image block is the SDM, and set the single sample index flag bit to "0", to indicate that a depth value of some or all of the pixels of the current image block is located in the first index location in the sample candidate set. Correspondingly, the decoder determines, according to a value of the single sample index flag bit that is obtained by decoding the video bitstream, that the prediction sample value of some or all of the pixels of the current image block is located in the first index location in the sample candidate set, and obtains the candidate depth value $2^{k1}$ located in the first index location in the sample candidate set, uses the candidate depth value $2^{k1}$ as the prediction sample value of some or all of the pixels of the current image block, and reconstructs the current image block using the depth value of some or all of the pixels of the current image block.

Example 7: The current image block is an image block of an 8×8 size in the depth map, the decoding mode corresponding to the current image block is the SDK and neither the first adjacent prediction sampling point nor the second adjacent prediction sampling point of the current image block is available. Therefore, the encoder and the decoder write a first preset depth value $2^{k1}$ into the first index location in the sample candidate set, and write a depth value $2^{k1}+1$ into the second index location in the sample candidate set. Therefore, the encoder may calculate, using the depth value $2^{k1}$ located in the first index location in the sample candidate set, the first rate distortion cost corresponding to the current image block, and the encoder may calculate, using the depth value $2^{k1}+1$ located in the second index location in the sample candidate set, the second rate distortion cost corresponding to the current image block. It is assumed that the first rate distortion cost is less than the second rate distortion cost, and therefore, the encoder may set the single sample flag bit corresponding to the current image block to "1", to indicate that the decoding mode of the current image block is the SDK and set the single sample index flag bit to "0", to indicate that a depth value of some or all of the pixels of the current image block is located in the first index location in the sample candidate set. Correspondingly, the decoder determines, according to a value of the single sample index flag bit that is obtained by decoding the video bitstream, that the prediction sample value of some or all of the pixels of the current image block is located in the first index location in the sample candidate set, and then may obtain the candidate depth value $2^{k1}$ located in the first index location in the sample candidate set, uses the candidate depth value $2^{k1}$ as the prediction sample value of some or all of the pixels of the current image block, and reconstructs the current image block using the depth value of some or all of the pixels of the current image block.

Example 8: The current image block is an image block of an 8×8 size in the depth map, the decoding mode corresponding to the current image block is the SDM, and neither the first adjacent prediction sampling point nor the second adjacent prediction sampling point of the current image block is available. Therefore, the encoder and the decoder write a first preset depth value $2^{k1}$ into the first index location in the sample candidate set, and write a depth value $2^{k2}$ into the second index location in the sample candidate set. Therefore, the encoder may calculate, using the depth value $2^{k1}$ located in the first index location in the sample candidate set, the first rate distortion cost corresponding to the current image block, and the encoder may calculate, using the depth value $2^{k2}$ located in the second index location in the sample candidate set, the second rate distortion cost corresponding to the current image block. It is assumed that the first rate distortion cost is less than the second rate distortion cost, and therefore, the encoder may set the single sample flag bit corresponding to the current image block to "1", to indicate that the decoding mode of the current image block is the SDM and set the single sample index flag bit to "0", to indicate that a depth value of some or all of the pixels of the current image block is located in the first index location in the sample candidate set. Correspondingly, the decoder determines, according to a value of the single sample index flag bit that is obtained by decoding the video bitstream, that the prediction sample value of some or all of the pixels of the current image block is located in the first index location in the sample candidate set, and then may obtain the candidate depth value $2^{k1}$ located in the first index location in the sample candidate set, uses the candidate depth value $2^{k1}$ as the prediction sample value of some or all of the pixels of the current image block, and reconstructs the current image block using the depth value of some or all of the pixels of the current image block.

Example 9: The current image block is an image block of an 8×8 size in the depth map, the decoding mode corresponding to the current image block is the SDM, and neither the first adjacent prediction sampling point nor the second adjacent prediction sampling point of the current image block is available. Therefore, the encoder and the decoder write a first preset depth value $2^{k1}$ into the first index location in the sample candidate set, and write the depth value $2^{k1}$ into the second index location in the sample candidate set. Therefore, the encoder may set the single sample flag bit corresponding to the current image block to "1", to indicate that the decoding mode of the current image block is the SDM, and set the single sample index flag bit to "0", to indicate that a depth value of some or all of the pixels of the current image block is located in the first index location in the sample candidate set. Correspondingly, the decoder determines, according to a value of the single sample index flag bit that is obtained by decoding the video bitstream, that the prediction sample value of some or all of the pixels of the current image block is located in the first index location in the sample candidate set, and then may obtain the candidate depth value $2^{k1}$ located in the first index location in the sample candidate set, uses the candidate depth value $2^{k1}$ as the prediction sample value of some or all of the pixels of the current image block, and reconstructs the current image block using the depth value of some or all of the pixels of the current image block.

It can be understood that the foregoing examples are merely for explanation, and values of some or all of the involved parameters may be adjusted according to an actual need.

The following further provides a related apparatus that is configured to implement the foregoing solutions.

Figure 6:
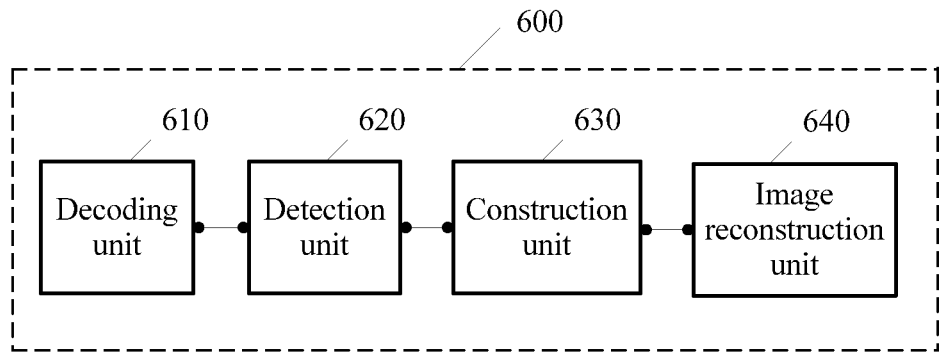
FIG. 6 is a schematic diagram of a video decoding apparatus according to an embodiment of the present application.

Referring to FIG. 6, an embodiment of the present application provides a video decoding apparatus, which may include a decoding unit 610, a detection unit 620, a construction unit 630, and an image reconstruction unit 640.

The decoding unit 610 is configured to decode a video bitstream to obtain a single sample flag bit corresponding to a current image block in a current depth map.

The detection unit 620 is configured to perform detection on a first adjacent prediction sampling point and a second adjacent prediction sampling point of the current image block in the current depth map if the single sample flag bit obtained by decoding indicates that a decoding mode corresponding to the current image block is a SDM.

Available adjacent prediction sampling points of the current image block may include only the first adjacent prediction sampling point and the second adjacent prediction sampling point.

Optionally, in some possible implementation manners of the present application, the first adjacent prediction sampling point and the second adjacent prediction sampling point are two preset adjacent prediction sampling points of the current image block. Therefore, the detection unit 620 may be further configured to perform detection on the first adjacent prediction sampling point and the second adjacent prediction sampling point that are set in the current image block in the current depth map.

Optionally, in some possible implementation manners of the present application, the detection unit 620 may be further configured to perform detection only on the first adjacent prediction sampling point and the second adjacent prediction sampling point (that are set) in the current image block in the current depth map.

The construction unit 630 is configured to construct a sample candidate set according to results of the detection on the first adjacent prediction sampling point and the second adjacent prediction sampling point, where the sample candidate set includes a first index location and a second index location.

The sample candidate set may include, for example, two or more index locations. For example, the sample candidate set includes the first index location and the second index location. That is, two candidate depth values may be recorded in the sample candidate set, and one candidate depth value may be recorded in each index location.

A data structure of the sample candidate set may be diversified, and no limitation is imposed on a specific form of the data structure of the sample candidate set in this embodiment of the present application.

The decoding unit 610 is further configured to decode the video bitstream to obtain a single sample index flag bit corresponding to the current image block.

The image reconstruction unit 640 is configured to obtain, according to an index location indicated by the single sample index flag bit obtained by decoding, a candidate depth value located in the index location that is indicated by the single sample index flag bit and that is in the sample candidate set, use the candidate depth value as a prediction sample value of some or all of pixels of the current image block, and reconstruct the current image block using the prediction sample value of some or all of the pixels of the current image block.

Optionally, in some possible implementation manners of the present application, the construction unit 630 is further configured to, if it is detected that the first adjacent prediction sampling point is available, and it is detected that the second adjacent prediction sampling point is available, write a depth value of the first adjacent prediction sampling point into the first index location in the sample candidate set corresponding to the current image block, and write a depth value of the second adjacent prediction sampling point into the second index location in the sample candidate set (the depth value of the first adjacent prediction sampling point and the depth value of the second adjacent prediction sampling point may be equal or unequal), or the construction unit 630 is further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and write the depth value of the first adjacent prediction sampling point into the second index location in the sample candidate set, or the construction unit 630 is further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and write, into the second index location in the sample candidate set, a depth value obtained by adding the depth value of the first adjacent prediction sampling point to a first adjustment value, or the construction unit 630 is further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and write, into the second index location in the sample candidate set, a depth value obtained by subtracting a second adjustment value from the depth value of the first adjacent prediction sampling point, or the construction unit 630 is further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and use a second preset depth value as a candidate value recorded in the second index location in the sample candidate set, or the construction unit 630 is further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and write an invalid depth value into the second index location in the sample candidate set, or the construction unit 630 is further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and skip writing any depth value into the second index location in the sample candidate set (in this case, it may be considered that only one candidate depth value is written into the sample candidate set), or the construction unit 630 is further configured to, if it is detected that the first adjacent prediction sampling point is unavailable, and it is detected that the second adjacent prediction sampling point is unavailable, use a first preset depth value as a candidate value recorded in the first index location in the sample candidate set corresponding to the current image block, and use a second preset depth value as a candidate value recorded in the second index location in the sample candidate set.

Optionally, in some possible implementation manners of the present application, the first preset depth value is equal to $2^{k1}$, k1 is equal to g_bitDepthY−x1, g_bitDepthY is equal to a quantity of coded bits, the first preset depth value is less than or equal to 255, and x1 is a positive integer. For example, x1 may be equal to 1, 2, 3, 4, or another value. Certainly, the first preset depth value is a positive integer.

Optionally, in some possible implementation manners of the present application, the second preset depth value is equal to $2^{k2}$, k2 is equal to g_bitDepthY−x2, the second preset depth value is less than or equal to 255, and x2 is a positive integer not equal to x1. For example, x2 may be equal to 1, 2, 3, 4, or another value. Certainly, the second preset depth value is a positive integer.

Alternatively, the second preset depth value is equal to the first preset depth value, or the second preset depth value is equal to a sum of the first preset depth value and the first adjustment value, or the second preset depth value is equal to a value obtained by subtracting the second adjustment value from the first preset depth value.

Optionally, the first adjustment value may be, for example, equal to 1, 2, 3, 4, 6, 10, 20, or another value. The second adjustment value may be, for example, equal to 1, 2, 3, 4, 6, 11, 25, or another value.

Optionally, in some possible implementation manners of the present application, a size of the current image block may be, for example, n*n, and n may be a positive even number. The first adjacent prediction sampling point and the second adjacent prediction sampling point may be, for example, any two of the following adjacent prediction sampling points of the current image block Optionally, in some possible implementation manners of the present application, a size of the current image block is n*n, and n is a positive even number. The first adjacent prediction sampling point and the second adjacent prediction sampling point are any two of the following adjacent prediction sampling points of the current image block an upper adjacent pixel of a pixel on an upper left corner of the current image block, a left adjacent pixel of a pixel on an upper left corner of the current image block, an upper left adjacent pixel of a pixel on an upper left corner of the current image block, or an upper adjacent pixel of the $((n+2)/2)^{th}$ pixel on an upper edge of the current image block and a left adjacent pixel of the $((n+2)/2)^{th}$ pixel on a left edge of the current image block.

Optionally, in some possible implementation manners of the present application, the first adjacent prediction sampling point is the upper adjacent pixel of the $((n+2)/2)^{th}$ pixel on the upper edge of the current image block, and the second adjacent prediction sampling point is the left adjacent pixel of the $((n+2)/2)^{th}$ pixel on the left edge of the current image block, or the second adjacent prediction sampling point is the upper adjacent pixel of the $((n+2)/2)^{th}$ pixel on the upper edge of the current image block, and the first adjacent prediction sampling point is the left adjacent pixel of the $((n+2)/2)^{th}$ pixel on the left edge of the current image block.

It can be understood that functions of functional modules of the video decoding apparatus 600 in this embodiment may be further implemented according to the methods in the foregoing method embodiments. For a specific implementation process of the functions, reference may be made to related description in the foregoing method embodiments, and details are not described herein.

The video decoding apparatus 600 may be any apparatus that needs to output or play a video, for example, a device such as a notebook computer, a tablet computer, a personal computer, a mobile phone, or a video server.

It can be learned that, according to this embodiment, the video decoding apparatus 600 performs detection on a first adjacent prediction sampling point and a second adjacent prediction sampling point of a current image block in a current depth map, constructs a sample candidate set according to results of the detection on the first adjacent prediction sampling point and the second adjacent prediction sampling point, decodes a single sample index flag bit that is corresponding to the current image block and that is in a video bitstream, obtains, according to an index location indicated by the single sample index flag bit obtained by decoding, a candidate depth value located in the index location that is indicated by the single sample index flag bit and that is in the sample candidate set, uses the candidate depth value as a depth value of some or all of pixels of the current image block, and reconstructs the current image block using the depth value of some or all of the pixels of the current image block. The sample candidate set is constructed according to the results of the detection on the two adjacent prediction sampling points, namely, the first adjacent prediction sampling point and the second adjacent prediction sampling point, that is, for the construction of the sample candidate set, reference may be made only to the results of the detection on the two adjacent prediction sampling points, which helps simplify a process of constructing the sample candidate set. In comparison with a traditional solution, the foregoing solution helps reduce complexity of an SDM-based decoding algorithm and decrease a storage space occupation requirement.

Figure 7:
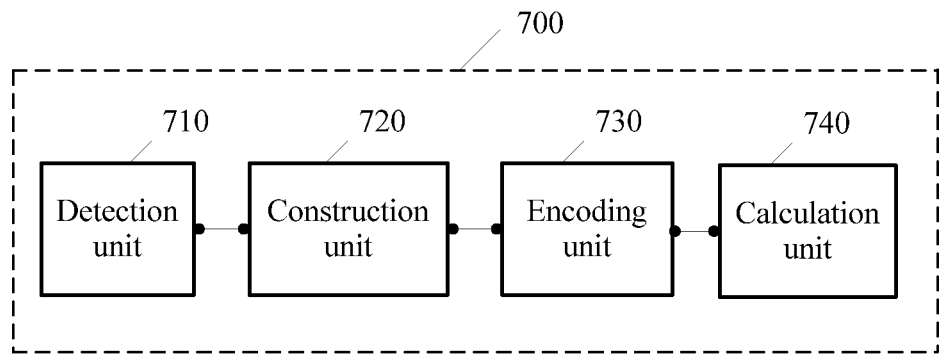
FIG. 7 is a schematic diagram of a video encoding apparatus according to an embodiment of the present application.

Referring to FIG. 7, an embodiment of the present application provides a video encoding apparatus 700, which may include a detection unit 710, a construction unit 720, and an encoding unit 730.

The detection unit 710 is configured to perform detection on a first adjacent prediction sampling point and a second adjacent prediction sampling point of a current image block in a current depth map.

Optionally, in some possible implementation manners of the present application, the first adjacent prediction sampling point and the second adjacent prediction sampling point are two preset adjacent prediction sampling points of the current image block. Therefore, the detection unit 710 may be further configured to perform detection on the first adjacent prediction sampling point and the second adjacent prediction sampling point that are set in the current image block in the current depth map.

Available adjacent prediction sampling points of the current image block may include only the first adjacent prediction sampling point and the second adjacent prediction sampling point.

Optionally, in some possible implementation manners of the present application, the detection unit 710 may be further configured to perform detection only on the first adjacent prediction sampling point and the second adjacent prediction sampling point (that are set) in the current image block in the current depth map.

The construction unit 720 is configured to construct a sample candidate set according to results of the detection on the first adjacent prediction sampling point and the second adjacent prediction sampling point, where the sample candidate set includes a first index location and a second index location.

The sample candidate set may include, for example, two or more index locations. For example, the sample candidate set includes the first index location and the second index location. That is, two candidate depth values may be recorded in the sample candidate set, and one candidate depth value may be recorded in each index location.

A data structure of the sample candidate set may be diversified, and no limitation is imposed on a specific form of the data structure of the sample candidate set in this embodiment of the present application.

The encoding unit 730 is configured to write, into a video bitstream, a single sample flag bit corresponding to the current image block, and write, into the video bitstream, a single sample index flag bit corresponding to the current image block.

The single sample flag bit indicates that a decoding mode corresponding to the current image block is a SDM, and the single sample index flag bit indicates that a prediction sample value of some or all of pixels of the current image block is located in the first index location or the second index location in the sample candidate set.

Optionally, in some possible implementation manners of the present application, the construction unit 720 is further configured to, if it is detected that the first adjacent prediction sampling point is available, and it is detected that the second adjacent prediction sampling point is available, write a depth value of the first adjacent prediction sampling point into the first index location in the sample candidate set corresponding to the current image block, and write a depth value of the second adjacent prediction sampling point into the second index location in the sample candidate set, or the construction unit 720 may be further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and write the depth value of the first adjacent prediction sampling point into the second index location in the sample candidate set, or the construction unit 720 may be further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and write, into the second index location in the sample candidate set, a depth value obtained by adding the depth value of the first adjacent prediction sampling point to a first adjustment value, or the construction unit 720 may be further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image, block, and write, into the second index location in the sample candidate set, a depth value obtained by subtracting a second adjustment value from the depth value of the first adjacent prediction sampling point, or the construction unit 720 may be further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and use a second preset depth value as a candidate value recorded in the second index location in the sample candidate set, or the construction unit 720 may be further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and write an invalid depth value into the second index location in the sample candidate set, or the construction unit 720 may be further configured to, if it is detected that the first adjacent prediction sampling point is available, and it is detected that the second adjacent prediction sampling point is unavailable, write a depth value of the first adjacent prediction sampling point into the first index location in the sample candidate set corresponding to the current image block, and skip writing any depth value into the second index location in the sample candidate set (in this case, it may be considered that only one candidate depth value is written into the sample candidate set), or the construction unit 720 may be further configured to, if it is detected that the first adjacent prediction sampling point is unavailable, and it is detected that the second adjacent prediction sampling point is unavailable, use a first preset depth value as a candidate value recorded in the first index location in the sample candidate set corresponding to the current image block, and use a second preset depth value as a candidate value recorded in the second index location in the sample candidate set.

Optionally, in some possible implementation manners of the present application, the first preset depth value is equal to $2^{k1}$, k1 is equal to g_bitDepthY−x1, g_bitDepthY is equal to a quantity of coded bits, the first preset depth value is less than or equal to 255, and x1 is a positive integer. For example, x1 may be equal to 1, 2, 3, 4, or another value. Certainly, the first preset depth value is a positive integer.

Optionally, in some possible implementation manners of the present application, the second preset depth value is equal to $2^{k2}$, k2 is equal to g_bitDepthY−x2, the second preset depth value is less than or equal to 255, and x2 is a positive integer not equal to x1. For example, x2 may be equal to 1, 2, 3, 4, or another value. Certainly, the second preset depth value is a positive integer.

Alternatively, the second preset depth value is equal to the first preset depth value, or the second preset depth value is equal to a sum of the first preset depth value and the first adjustment value, or the second preset depth value is equal to a value obtained by subtracting the second adjustment value from the first preset depth value.

Optionally, the first adjustment value may be, for example, equal to 1, 2, 3, 4, 6, 10, 20, or another value. The second adjustment value may be, for example, equal to 1, 2, 3, 4, 6, 11, 25, or another value.

Optionally, in some possible implementation manners of the present application, a size of the current image block may be, for example, n*n, and n may be a positive even number. The first adjacent prediction sampling point and the second adjacent prediction sampling point may be, for example, any two of the following adjacent prediction sampling points of the current image block an upper adjacent pixel of a pixel on an upper left corner of the current image block, a left adjacent pixel of a pixel on an upper left corner of the current image block, an upper left adjacent pixel of a pixel on an upper left corner of the current image block, or an upper adjacent pixel of the $((n+2)/2)^{th}$ pixel on an upper edge of the current image block and a left adjacent pixel of the $((n+2)/2)^{th}$ pixel on a left edge of the current image block.

As shown in FIG. 2A, a pixel in a start location on the left of the upper edge of the current image block is the $0^{th}$ pixel $B_0$ on the upper edge, and a pixel in a start location at the top of the left edge of the current image block is the $0^{th}$ pixel $A_0$ on the left edge.

Optionally, in some possible implementation manners of the present application, as shown in FIG. 2B, the first adjacent prediction sampling point is the upper adjacent pixel of the $((n+2)/2)^{th}$ pixel $B_{n/2}$ on the upper edge of the current image block, and the second adjacent prediction sampling point is the left adjacent pixel of the $((n+2)/2)^{th}$ pixel $A_{n/2}$ on the left edge of the current image block, or the second adjacent prediction sampling point may be the upper adjacent pixel of the $((n+2)/2)^{th}$ pixel $B_{n/2}$ on the upper edge of the current image block, and the first adjacent prediction sampling point may be the left adjacent pixel of the $(n+2)/2)^{th}$ pixel $A_{n/2}$ on the left edge of the current image block.

Optionally, the video encoding apparatus 700 may further include a calculation unit 740 configured to, before the single sample index flag bit corresponding to the current image block is written into the video bitstream, calculate, using the depth value located in the first index location in the sample candidate set, a first rate distortion cost corresponding to the current image block, and calculate, using the depth value located in the second index location in the sample candidate set, a second rate distortion cost corresponding to the current image block, where if the first rate distortion cost is less than or equal to the second rate distortion cost, the single sample index flag bit indicates that the prediction sample value of some or all of the pixels of the current image block is located in the first index location in the sample candidate set, if the first rate distortion cost is greater than the second rate distortion cost, the single sample index flag bit indicates that the prediction sample value of some or all of the pixels of the current image block is located in the second index location in the sample candidate set.

Certainly, whether the single sample index flag bit indicates that the prediction sample value of some or all of the pixels of the current image block is located in the first index location or the second index location in the sample candidate set may also be determined in another manner. For example, when the depth value located in the first index location in the sample candidate set and the depth value located in the second index location in the sample candidate set are the same, the single sample index flag bit may indicate that the prediction sample value of some or all of the pixels of the current image block is located in either of the first index location or the second index location in the sample candidate set.

It can be understood that functions of functional modules of the video encoding apparatus 700 in this embodiment may be further implemented according to the methods in the foregoing method embodiments. For a specific implementation process of the functions, reference may be made to related description in the foregoing method embodiments, and details are not described herein.

The video encoding apparatus 700 may be any apparatus that needs to output or play a video, for example, a device such as a notebook computer, a tablet computer, a personal computer, a mobile phone, or a video server.

It can be learned that, according to this embodiment, the video encoding apparatus 700 performs detection on a first adjacent prediction sampling point and a second adjacent prediction sampling point of a current image block in a current depth map, constructs a sample candidate set according to results of the detection on the first adjacent prediction sampling point and the second adjacent prediction sampling point, and writes, into a video bitstream, a single sample flag bit and a single sample index flag bit that are corresponding to the current image block, where the single sample flag bit indicates that a decoding mode corresponding to the current image block is a SDM, and the single sample index flag bit indicates that a prediction sample value of some or all of pixels of the current image block is located in a first index location or a second index location in the sample candidate set. The sample candidate set is constructed according to the results of the detection on the two adjacent prediction sampling points, namely, the first adjacent prediction sampling point and the second adjacent prediction sampling point, that is, for the construction of the sample candidate set, reference may be made only to the results of the detection on the two adjacent prediction sampling points, which helps simplify a process of constructing the sample candidate set. In comparison with a traditional solution (in the traditional solution, for construction of a sample candidate set, reference is made to at least five adjacent prediction sampling points of a current image block), the foregoing solution helps reduce complexity of an SDM-based encoding algorithm and decrease a storage space occupation requirement.

Figure 8:
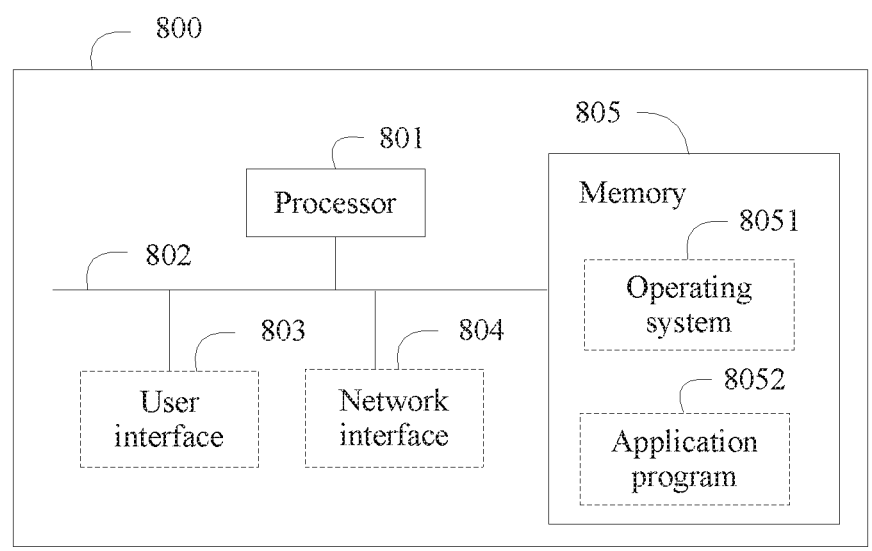
FIG. 8 is a schematic diagram of another video encoding apparatus according to an embodiment of the present application.

Referring to FIG. 8, FIG. 8 is a structural block diagram of a video encoding apparatus 800 according to another embodiment of the present application. The video encoding apparatus 800 may include at least one processor 801, a memory 805, and at least one communications bus 802. Optionally, the video encoding apparatus 800 may further include at least one network interface 804 and/or user interface 803. The user interface 803 includes, for example, a display (such as a touchscreen, a liquid crystal display (LCD), a holographic imaging device, a cathode ray tube (CRT), or a projector), a click device (such as a mouse or a trackball touch panel or touchscreen), a camera, and/or a pickup apparatus.

The memory 805 may include a read-only memory (ROM) and a random access memory (RAM), and provide an instruction and data for the processor 801. A part of the memory 805 may further include a non-volatile RAM (NVRAM).

In some implementation manners, the memory 805 stores the following elements: an executable module or a data structure, or a subset thereof, or an extended set thereof, an operating system 8051, including various system programs and configured to implement various basic services and process a hardware-based task, and an application program module 8052, including various application programs and configured to implement various application services.

According to this embodiment of the present application, by invoking a program or an instruction that is stored in a memory 805, a processor 801 is configured to perform detection on a first adjacent prediction sampling point and a second adjacent prediction sampling point of a current image block in a current depth map, construct a sample candidate set according to results of the detection on the first adjacent prediction sampling point and the second adjacent prediction sampling point, where the sample candidate set includes a first index location and a second index location, write, into a video bitstream, a single sample flag bit corresponding to the current image block, and write, into the video bitstream, a single sample index flag bit corresponding to the current image block, where the single sample flag bit indicates that a decoding mode corresponding to the current image block is a SDM, and the single sample index flag bit indicates that a prediction sample value of some or all of pixels of the current image block is located in the first index location or the second index location in the sample candidate set.

Available adjacent prediction sampling points of the current image block may include only the first adjacent prediction sampling point and the second adjacent prediction sampling point.

Optionally, in some possible implementation manners of the present application, the first adjacent prediction sampling point and the second adjacent prediction sampling point are two preset adjacent prediction sampling points of the current image block. Therefore, the performing detection on a first adjacent prediction sampling point and a second adjacent prediction sampling point of a current image block in a current depth map may include performing detection on the first adjacent prediction sampling point and the second adjacent prediction sampling point that are set in the current image block in the current depth map.

Optionally, in some possible implementation manners of the present application, the performing detection on a first adjacent prediction sampling point and a second adjacent prediction sampling point of a current image block in a current depth map may include performing detection only on the first adjacent prediction sampling point and the second adjacent prediction sampling point (that are set) in the current image block in the current depth map.

The sample candidate set may include, for example, two or more index locations. For example, the sample candidate set includes the first index location and the second index location. That is, two candidate depth values may be recorded in the sample candidate set, and one candidate depth value may be recorded in each index location.

A data structure of the sample candidate set may be diversified, and no limitation is imposed on a specific form of the data structure of the sample candidate set in this embodiment of the present application.

An implementation manner of constructing the sample candidate set by the processor 801 according to the results of the detection on the first adjacent prediction sampling point and the second adjacent prediction sampling point may be diversified. The first adjacent prediction sampling point and the second adjacent prediction sampling point may be detected in a same sequence or in different sequences.

For example, that the processor 801 constructs a sample candidate set according to results of the detection on the first adjacent prediction sampling point and the second adjacent prediction sampling point may include, if it is detected that the first adjacent prediction sampling point is available, and it is detected that the second adjacent prediction sampling point is available, writing a depth value of the first adjacent prediction sampling point into the first index location in the sample candidate set corresponding to the current image block, and writing a depth value of the second adjacent prediction sampling point into the second index location in the sample candidate set (the depth value of the first adjacent prediction sampling point and the depth value of the second adjacent prediction sampling point may be equal or unequal), or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing the depth value of the first adjacent prediction sampling point into the second index location in the sample candidate set, or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing, into the second index location in the sample candidate set, a depth value obtained by adding the depth value of the first adjacent prediction sampling point to a first adjustment value (the first adjustment value is a positive integer), or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing, into the second index location in the sample candidate set, a depth value obtained by subtracting a second adjustment value (the second adjustment value is a positive integer) from the depth value of the first adjacent prediction sampling point, or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing an invalid depth value into the second index location in the sample candidate set, or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and skipping writing any depth value into the second index location m the sample candidate set (in this case, it may be considered that only one candidate depth value is written into the sample candidate set), or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and using a second preset depth value as a candidate value recorded in the second index location in the sample candidate set (where the second preset depth value may be, for example, written into the second index location in the sample candidate set in a process of initializing the sample candidate set, and certainly, the second preset depth value may also be written into the second index location in the sample candidate set after it is detected that the second adjacent prediction sampling point is unavailable), or if it is detected that the first adjacent prediction sampling point is unavailable, and it is detected that the second adjacent prediction sampling point is unavailable, using a first preset depth value as a candidate value recorded in the first index location in the sample candidate set corresponding to the current image block (the first preset depth value may be, for example, written into the first index location in the sample candidate set in a process of initializing the sample candidate set, and certainly, the first preset depth value may also be written into the first index location in the sample candidate set after it is detected that neither the first adjacent prediction sampling point nor the second adjacent prediction sampling point is available), and using a second preset depth value as a candidate value recorded in the second index location in the sample candidate set (the second preset depth value may be, for example, written into the second index location in the sample candidate set in a process of initializing the sample candidate set, and certainly, the second preset depth value may also be written into the second index location in the sample candidate set after it is detected that neither the first adjacent prediction sampling point nor the second adjacent prediction sampling point is available).

Certainly, the sample candidate set may also be constructed in another implementation manner according to the results of the detection on the first adjacent prediction sampling point and the second adjacent prediction sampling point. Mechanisms for filling in the sample candidate set by a decoder and an encoder may be the same or similar.

Optionally, in some possible implementation manners of the present application, the first preset depth value is equal to $2^{k1}$, k1 is equal to g_bitDepthY−x1, g_bitDepthY is equal to a quantity of coded bits, the first preset depth value is less than or equal to 255, and x1 is a positive integer. For example, x1 may be equal to 1, 2, 3, 4, or another value. Certainly, the first preset depth value is a positive integer.

Optionally, in some possible implementation manners of the present application, the second preset depth value is equal to $2^{k2}$, k2 is equal to g_bitDepthY−x2, the second preset depth value is less than or equal to 255, and x2 is a positive integer not equal to x1. For example, x2, may be equal to 1, 3, 4, or another value. Certainly, the second preset depth value is a positive integer.

Alternatively, the second preset depth value is equal to the first preset depth value, or the second preset depth value is equal to a sum of the first preset depth value and the first adjustment value, or the second preset depth value is equal to a value obtained by subtracting the second adjustment value from the first preset depth value.

Optionally, the first adjustment value may be, for example, equal to 1, 2, 3, 4, 6, 10, 20, or another value. The second adjustment value may be, for example, equal to 1, 2, 3, 4, 6, 11, 25, or another value.

Optionally, in some possible implementation manners of the present application, a size of the current image block may be, for example, n*n, and n may be a positive even number. The first adjacent prediction sampling point and the second adjacent prediction sampling point may be, for example, any two of the following adjacent prediction sampling points of the current image block: an upper adjacent pixel of a pixel on an upper left corner of the current image block, a left adjacent pixel of a pixel on an upper left corner of the current image block, an upper left adjacent pixel of a pixel on an upper left corner of the current image block, or an upper adjacent pixel of the $((n+2)/2)^{th}$ pixel on an upper edge of the current image block and a left adjacent pixel of the $((n+2)/2)^{th}$ pixel on a left edge of the current image block.

Optionally, in some possible implementation manners of the present application, the first adjacent prediction sampling point is the upper adjacent pixel of the $((n+2)/2)^{th}$ pixel $B_{n/2}$ on the upper edge of the current image block, and the second adjacent prediction sampling point is the left adjacent pixel of the $((n+2)/2)^{th}$ pixel $A_{n/2}$ on the left edge of the current image block, or the second adjacent prediction sampling point may be the upper adjacent pixel of the $((n+2)/2)^{th}$ pixel $B_{n/2}$ on the upper edge of the current image block, and the first adjacent prediction sampling point may be the left adjacent pixel of the $((n+2)/2)^{th}$ pixel $A_{n/2}$ on the left edge of the current image block.

Optionally, in some possible implementation manners of the present application, before the writing, into the video bitstream, a single sample index flag bit corresponding to the current image block, the processor 801 is further configured to calculate, using the depth value located in the first index location in the sample candidate set, a first rate distortion cost corresponding to the current image block, and calculate, using the depth value located in the second index location in the sample candidate set, a second rate distortion cost corresponding to the current image block, where if the first rate distortion cost is less than or equal to the second rate distortion cost, the single sample index flag bit indicates that the prediction sample value of some or all of the pixels of the current image block is located in the first index location in the sample candidate set, if the first rate distortion cost is greater than the second rate distortion cost, the single sample index flag bit indicates that the prediction sample value of some or all of the pixels of the current image block is located in the second index location in the sample candidate set.

Certainly, the processor 801 may also determine, in another manner, whether the single sample index flag bit indicates that the prediction sample value of some or all of the pixels of the current image block is located in the first index location or the second index location in the sample candidate set. For example, when the depth value located in the first index location in the sample candidate set and the depth value located in the second index location in the sample candidate set are the same, the single sample index flag bit may indicate that the prediction sample value of some or all of the pixels of the current image block is located in either of the first index location or the second index location in the sample candidate set.

It can be understood that functions of functional modules of the video encoding apparatus 800 in this embodiment may be further implemented according to the methods in the foregoing method embodiments. For a specific implementation process of the functions, reference may be made to related description in the foregoing method embodiments, and details are not described herein.

The video encoding apparatus 800 may be any apparatus that needs to output or play a video, for example, a device such as a notebook computer, a tablet computer, a personal computer, a mobile phone, or a video server.

It can be learned that, according to this embodiment, the video encoding apparatus 800 performs detection on a first adjacent prediction sampling point and a second adjacent prediction sampling point of a current image block in a current depth map, constructs a sample candidate set according to results of the detection on the first adjacent prediction sampling point and the second adjacent prediction sampling point, and writes, into a video bitstream, a single sample flag bit and a single sample index flag bit that are corresponding to the current image block, where the single sample flag bit indicates that a decoding mode corresponding to the current image block is a SDM, and the single sample index flag bit indicates that a prediction sample value of some or all of pixels of the current image block is located in a first index location or a second index location in the sample candidate set. The sample candidate set is constructed according to the results of the detection on the two adjacent prediction sampling points, namely, the first adjacent prediction sampling point and the second adjacent prediction sampling point, that is, for the construction of the sample candidate set, reference may be made only to the results of the detection on the two adjacent prediction sampling points, which helps simplify a process of constructing the sample candidate set. In comparison with a traditional solution (in the traditional solution, for construction of a sample candidate set, reference is made to at least five adjacent prediction sampling points of a current image block), the foregoing solution helps reduce complexity of an SIM-based encoding algorithm and decrease a storage space occupation requirement.

Figure 9:
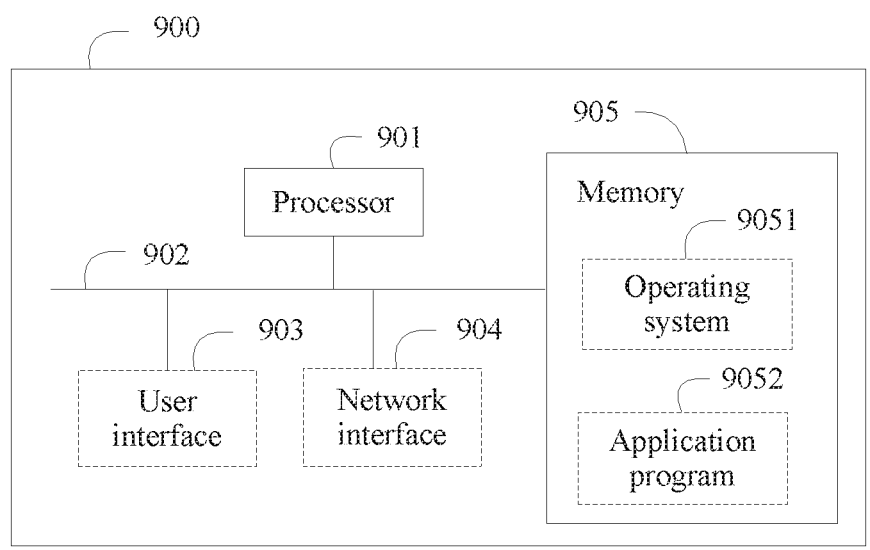
FIG. 9 is a schematic diagram of another video decoding apparatus according to an embodiment of the present application.

Referring to FIG. 9, FIG. 9 is a structural block diagram of a video decoding apparatus 900 according to another embodiment of the present application. The video decoding apparatus 900 may include at least one processor 901, a memory 905, and at least one communications bus 902. Optionally, the video decoding apparatus 900 may further include at least one network interface 904 and/or user interface 903. The user interface 903 includes, for example, a display (such as a touchscreen, an LCD, a holographic imaging device, a CRT, or a projector), a click device (such as a mouse or a trackball touch panel or touchscreen), a camera, and/or a pickup apparatus.

The memory 905 may include a ROM and a RAM, and provide an instruction and data for the processor 901. A part of the memory 905 may further include a NVRAM.

In some implementation manners, the memory 905 stores the following elements: an executable module or a data structure, or a subset thereof, or an extended set thereof, an operating system 9051, including various system programs and configured to implement various basic services and process a hardware-based task, and an application program module 9052, including various application programs and configured to implement various application services.

According to this embodiment of the present application, by invoking a program or an instruction that is stored in a memory 905, a processor 901 decodes a video bitstream to obtain a single sample flag bit corresponding to a current image block in a current depth map, performs detection on a first adjacent prediction sampling point and a second adjacent prediction sampling point of the current image block in the current depth map if the single sample flag bit obtained by decoding indicates that a decoding mode corresponding to the current image block is a SDM, constructs a sample candidate set according to results of the detection on the first adjacent prediction sampling point and the second adjacent prediction sampling point, decodes the video bitstream to obtain a single sample index flag bit corresponding to the current image block, obtains, according to an index location indicated by the single sample index flag bit obtained by decoding, a candidate depth value located in the index location that is indicated by the single sample index flag bit and that is in the sample candidate set, uses the candidate depth value as a prediction sample value of some or all of pixels of the current image block, and reconstructs the current image block using the prediction sample value of some or all of the pixels of the current image block.

Optionally, in some possible implementation manners of the present application, the first adjacent prediction sampling point and the second adjacent prediction sampling point are two preset adjacent prediction sampling points of the current image block. Therefore, the processor 901 may perform detection on the first adjacent prediction sampling point and the second adjacent prediction sampling point that are set in the current image block in the current depth map.

Available adjacent prediction sampling points of the current image block may include only the first adjacent prediction sampling point and the second adjacent prediction sampling point.

Optionally, in some possible implementation manners of the present application, the processor 901 may be configured to perform detection only on the first adjacent prediction sampling point and the second adjacent prediction sampling point (that are set) in the current image block in the current depth map.

The sample candidate set may include, for example, two or more index locations. For example, the sample candidate set includes a first index location and a second index location. That is, two candidate depth values may be recorded in the sample candidate set, and one candidate depth value may be recorded in each index location.

A data structure of the sample candidate set may be diversified, and no limitation is imposed on a specific form of the data structure of the sample candidate set in this embodiment of the present application.

An implementation manner of constructing the sample candidate set by the processor 901 according to the results of the detection on the first adjacent prediction sampling point and the second adjacent prediction sampling point may be diversified.

The first adjacent prediction sampling point and the second adjacent prediction sampling point may be detected in a same sequence or in different sequences.

For example, that the processor 901 constructs a sample candidate set according to results of the detection on the first adjacent prediction sampling point and the second adjacent prediction sampling point may include, if it is detected that the first adjacent prediction sampling point is available, and it is detected that the second adjacent prediction sampling point is available, writing a depth value of the first adjacent prediction sampling point into the first index location in the sample candidate set corresponding to the current image block, and writing a depth value of the second adjacent prediction sampling point into the second index location in the sample candidate set (the depth value of the first adjacent prediction sampling point and the depth value of the second adjacent prediction sampling point may be equal or unequal), or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing the depth value of the first adjacent prediction sampling point into the second index location in the sample candidate set, or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing, into the second index location in the sample candidate set, a depth value obtained by adding the depth value of the first adjacent prediction sampling point to a first adjustment value (the first adjustment value is a positive integer), or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing, into the second index location in the sample candidate set, a depth value obtained by subtracting a second adjustment value (the second adjustment value is a positive integer) from the depth value of the first adjacent prediction sampling point, or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and writing an invalid depth value into the second index location in the sample candidate set, or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and skipping writing any depth value into the second index location in the sample candidate set (in this case, it may be considered that only one candidate depth value is written into the sample candidate set), or if it is detected that the first adjacent prediction sampling point is available, and it is detected that the second adjacent prediction sampling point is unavailable, writing a depth value of the first adjacent prediction sampling point into the first index location in the sample candidate set corresponding to the current image block, and using a second preset depth value as a candidate value recorded in the second index location in the sample candidate set (where the second preset depth value may be, for example, written into the second index location in the sample candidate set in a process of initializing the sample candidate set, and certainly, the second preset depth value may also be written into the second index location in the sample candidate set after it is detected that the second adjacent prediction sampling point is unavailable), or if it is detected that the first adjacent prediction sampling point is unavailable, and it is detected that the second adjacent prediction sampling point is unavailable, using a first preset depth value as a candidate value recorded in the first index location in the sample candidate set corresponding to the current image block (the first preset depth value may be, for example, written into the first index location in the sample candidate set in a process of initializing the sample candidate set, and certainly, the first preset depth value may also be written into the first index location in the sample candidate set after it is detected that neither the first adjacent prediction sampling point nor the second adjacent prediction sampling point is available), and using a second preset depth value as a candidate value recorded in the second index location in the sample candidate set (the second preset depth value may be, for example, written into the second index location in the sample candidate set in a process of initializing the sample candidate set, and certainly, the second preset depth value may also be written into the second index location in the sample candidate set after it is detected that neither the first adjacent prediction sampling point nor the second adjacent prediction sampling point is available).

Certainly, the processor 901 may also construct the sample candidate set in another implementation manner according to the results of the detection on the first adjacent prediction sampling point and the second adjacent prediction sampling point. Mechanisms for filling in the sample candidate set by a decoder and an encoder may be the same or similar.

Optionally, in some possible implementation manners of the present application, the first preset depth value is equal to $2^{k1}$, k1 is equal to g_bitDepthY−x1, g_bitDepthY is equal to a quantity of coded bits, the first preset depth value is less than or equal to 255, and x1 is a positive integer. For example, x1 may be equal to 1, 2, 3, 4, or another value. Certainly, the first preset depth value is a positive integer.

Optionally, in some possible implementation manners of the present application, the second preset depth value is equal to $2^{k2}$, k2 is equal to g_bitDepthY−x2, the second preset depth value is less than or equal to 255, and x2 is a positive integer not equal to x1. For example, x2 may be equal to 1, 2, 3, 4, or another value. Certainly, the second preset depth value is a positive integer.

Alternatively, the second preset depth value is equal to the first preset depth value, or the second preset depth value is equal to a sum of the first preset depth value and the first adjustment value, or the second preset depth value is equal to a value obtained by subtracting the second adjustment value from the first preset depth value.

Optionally, the first adjustment value may be, for example, equal to 1, 2, 3, 4, 6, 10, 20, or another value. The second adjustment value may be, for example, equal to 1, 2, 3, 4, 6, 11, 25, or another value.

Optionally, in some possible implementation manners of the present application, a size of the current image block may be, for example, n*n, and n may be a positive even number. The first adjacent prediction sampling point and the second adjacent prediction sampling point may be, for example, any two of the following adjacent prediction sampling points of the current image block an upper adjacent pixel of a pixel on an upper left corner of the current image block, a left adjacent pixel of a pixel on an upper left corner of the current image block, an upper left adjacent pixel of a pixel on an upper left corner of the current image block, or an upper adjacent pixel of the $((n+2)/2)^{th}$ pixel on an upper edge of the current image block and a left adjacent pixel of the $((n+2)/2)^{th}$ pixel on a left edge of the current image block.

As shown in FIG. 2A, a pixel in a start location on the left of the upper edge of the current image block is the $0^{th}$ pixel $B_0$ on the upper edge, and a pixel in a start location at the top of the left edge of the current image block is the $0^{th}$ pixel $A_0$ on the left edge.

Optionally, in some possible implementation manners of the present application, as shown in FIG. 2B, the first adjacent prediction sampling point is the upper adjacent pixel of the $((n+2)/2)^{th}$ pixel $B_{n/2}$ on the upper edge of the current image block, and the second adjacent prediction sampling point is the left adjacent pixel of the $((n+2)/2)^{th}$ pixel $A_{n/2}$ on the left edge of the current image block, or the second adjacent prediction sampling point may be the upper adjacent pixel of the $((n+2)/2)^{th}$ pixel $B_{n/2}$ on the upper edge of the current image block, and the first adjacent prediction sampling point may be the left adjacent pixel of the $((n+2)/2)^{th}$ pixel $A_{n/2}$ on the left edge of the current image block.

It can be understood that functions of functional modules of the video decoding apparatus 900 in this embodiment may be further implemented according to the methods in the foregoing method embodiments. For a specific implementation process of the functions, reference may be made to related description in the foregoing method embodiments, and details are not described herein.

The video decoding apparatus 900 may be any apparatus that needs to output or play a video, for example, a device such as a notebook computer, a tablet computer, a personal computer, a mobile phone, or a video server.

It can be learned that, according to this embodiment, the video decoding apparatus 900 performs detection on a first adjacent prediction sampling point and a second adjacent prediction sampling point of a current image block in a current depth map, constructs a sample candidate set according to results of the detection on the first adjacent prediction sampling point and the second adjacent prediction sampling point, decodes a single sample index flag hit that is corresponding to the current image block and that is in a video bitstream, obtains, according to an index location indicated by the single sample index flag bit obtained by decoding, a candidate depth value located in the index location that is indicated by the single sample index flag bit and that is in the sample candidate set, uses the candidate depth value as a depth value of some or all of pixels of the current image block, and reconstructs the current image block using the depth value of some or all of the pixels of the current image block. The sample candidate set is constructed according to the results of the detection on the two adjacent prediction sampling points, namely, the first adjacent prediction sampling point and the second adjacent prediction sampling point, that is, for the construction of the sample candidate set, reference may be made only to the results of the detection on the two adjacent prediction sampling points, which helps simplify a process of constructing the sample candidate set. In comparison with a traditional solution, the foregoing solution helps reduce complexity of an SDM-based decoding algorithm and decrease a storage space occupation requirement.

It should be noted that, to make the description brief, the foregoing method embodiments are expressed as a series of action combinations. However, persons skilled in the art should understand that the present application is not limited to the described action sequence, because according to the present application, some steps may be performed in other sequences or performed simultaneously. In addition, persons skilled in the art should also understand that all the embodiments described in the specification are exemplary embodiments, and the related actions and modules are not necessarily mandatory to the present application.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical or other forms.

The units described as separate parts may or may not be physically separated, and parts shown as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of the software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present application. The foregoing storage medium includes any medium that can store program code, such as a universal serial bus (USB) flash drive, a ROM, a RAM, a removable hard disk, a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features of the technical solutions, without departing from the spirit and scope of the technical solutions of the embodiments of the present application.

What is claimed is:

1. A method, comprising:
  decoding a video bitstream to obtain a single sample flag bit corresponding to a current image block in a current depth map, a size of the current image block being n*n, and n being a positive even number;
  performing detection on an upper adjacent pixel of a $((n+2)/2)^{th}$ pixel on an upper edge of the current image block and a left adjacent pixel of a $((n+2)/2)^{th}$ pixel on a left edge of the current image block in the current depth map in response to the single sample flag bit indicating that a decoding mode corresponding to the current image block is a single depth intra-frame mode (SDM), available adjacent prediction sampling points of the current image block comprising only the upper adjacent pixel and the left adjacent pixel;
  in response to the upper adjacent pixel being available and the left adjacent pixel being available:
    setting a depth value of the upper adjacent pixel into a first index location corresponding to the current image block; and
    setting a depth value of the left adjacent pixel into a second index location corresponding to the current image block;
  in response to the upper adjacent pixel available and the left adjacent pixel being unavailable doing at least one of the following four actions:
    setting the depth value of the upper adjacent pixel into the first index location corresponding to the current image block and setting the depth value of the upper adjacent pixel into the second index location corresponding to the current image block;
    setting the depth value of the upper adjacent pixel into the first index location corresponding to the current image block and setting a second depth value obtained by adding the depth value of the upper adjacent pixel to a first adjustment value into the second index location corresponding to the current image block;
    setting the depth value of the upper adjacent pixel into the first index location corresponding to the current image block and setting a third depth value obtained by subtracting a second adjustment value from the depth value of the upper adjacent pixel into the second index location corresponding to the current image block; or
    setting the depth value of the upper adjacent pixel into the first index location corresponding to the current image block and using a second preset depth value as a candidate value recorded in the second index location corresponding to the current image block;
  in response to the upper adjacent pixel being unavailable and the left adjacent pixel being unavailable:
    using a first preset depth value as a candidate value recorded in a first index location corresponding to the current image block; and
    using the second preset depth value as the candidate value recorded in the second index location corresponding to the current image block;
  in response to the upper adjacent pixel being unavailable and the left adjacent pixel being available doing at least one of the following four actions:
    setting the depth value of the left adjacent pixel into the first index location corresponding to the current image block and setting the depth value of the left adjacent pixel into the second index location corresponding to the current image block;
    setting the depth value of the left adjacent pixel into the first index location corresponding to the current image block and setting a fourth depth value obtained by adding the depth value of the left adjacent pixel to the first adjustment value into the second index location corresponding to the current image block;
    setting the depth value of the left adjacent pixel into the first index location corresponding to the current image block and setting a fifth depth value obtained by subtracting the second adjustment value from the depth value of the left adjacent pixel into the second index location corresponding to the current image block; or
    setting the depth value of the left adjacent pixel into the first index location corresponding to the current image block and using the second preset depth value as the candidate value recorded in the second index location corresponding to the current image block;
  decoding the video bitstream to obtain a single sample index flag bit corresponding to the current image block;
  obtaining a candidate depth value located in an index location that is indicated by the single sample index flag bit according to the index location indicated by the single sample index flag bit obtained by decoding;
  using the candidate depth value as a prediction sample value of at least one of a plurality of pixels of the current image block; and
  reconstructing the current image block using the prediction sample value of the at least one of the pixels of the current image block.

2. The method of claim 1, wherein the first preset depth value is equal to $2^{k1}$, k1 is equal to g_bitDepthY−x1, g_bitDepthY is equal to a quantity of coded bits, the first preset depth value is less than or equal to 255, and x1 is a positive integer.

3. The method of claim 1, wherein the second preset depth value is equal to $2^{k2}$, k2 is equal to g_bitDepthY−x2, the second preset depth value is less than or equal to 255, x2 is a positive integer not equal to x1, and x1 is a positive integer.

4. The method of claim 1, wherein the second preset depth value is equal to the first preset depth value.

5. The method of claim 1, wherein the second preset depth value is equal to a sum of the first preset depth value and the first adjustment value.

6. The method of claim 1, wherein the second preset depth value is equal to a value obtained by subtracting the second adjustment value from the first preset depth value.

7. A method, comprising:
performing detection on an upper adjacent pixel of a ((n+2)/2)th pixel on an upper edge of a current image block and a left adjacent pixel of a ((n+2)/2)th pixel on a left edge of the current image block in a current depth map, available adjacent prediction sampling points of the current image block comprising only the upper adjacent pixel and the left adjacent pixel, a size of the current image block being n*n, and n being a positive even number;
in response to the upper adjacent pixel being available and the left adjacent pixel being available:
setting a depth value of the upper adjacent pixel into a first index location corresponding to the current image block; and
setting a depth value of the left adjacent pixel into a second index location corresponding to the current image block;
in response to the upper adjacent pixel is available and the left adjacent pixel being unavailable doing at least one of the following four actions:
setting the depth value of the upper adjacent pixel into the first index location corresponding to the current image block and setting the depth value of the upper adjacent pixel into the second index location corresponding to the current image block;
setting the depth value of the upper adjacent pixel into the first index location corresponding to the current image block and setting a second depth value obtained by adding the depth value of the upper adjacent pixel to a first adjustment value into the second index location corresponding to the current image block;
setting the depth value of the upper adjacent pixel into the first index location corresponding to the current image block and setting a third depth value obtained by subtracting a second adjustment value from the depth value of the upper adjacent pixel into the second index location corresponding to the current image block; or
setting the depth value of the upper adjacent pixel into the first index location corresponding to the current image block and using a second preset depth value as a candidate value recorded in the second index location corresponding to the current image block;
in response to the upper adjacent pixel being unavailable and the left adjacent pixel being unavailable:
using a first preset depth value as a candidate value recorded in a first index location corresponding to the current image block; and
using the second preset depth value as the candidate value recorded in the second index location corresponding to the current image block;
in response to the upper adjacent pixel being unavailable and the left adjacent pixel being available doing at least one of the following four actions:
setting the depth value of the left adjacent pixel into the first index location corresponding to the current image block and setting the depth value of the left adjacent pixel into the second index location corresponding to the current image block;
setting the depth value of the left adjacent pixel into the first index location corresponding to the current image block and setting a fourth depth value obtained by adding the depth value of the left adjacent pixel to the first adjustment value into the second index location corresponding to the current image block;
setting the depth value of the left adjacent pixel into the first index location corresponding to the current image block and setting a fifth depth value obtained by subtracting the second adjustment value from the depth value of the left adjacent pixel into the second index location corresponding to the current image block; or
setting the depth value of the left adjacent pixel into the first index location corresponding to the current image block and using the second preset depth value as the candidate value recorded in the second index location corresponding to the current image block;
writing a single sample flag bit corresponding to the current image block into a video bitstream; and
writing a single sample index flag bit corresponding to the current image block into the video bitstream, the single sample flag bit indicating that a decoding mode corresponding to the current image block is a single depth intra-frame mode (SDM), and the single sample index flag bit indicating that a prediction sample value of at least one of a plurality of pixels of the current image block is located in the first index location or the second index location corresponding to the current image block.

8. The method of claim 7, wherein the first preset depth value is equal to $2^{k1}$, k1 is equal to g_bitDepthY−x1, g_bitDepthY is equal to a quantity of coded bits, the first preset depth value is less than or equal to 255, and x1 is a positive integer.

9. The method of claim 7, wherein the second preset depth value is equal to $2^{k2}$, k2 is equal to g_bitDepthY−x2, the second preset depth value is less than or equal to 255, x2 is a positive integer not equal to x1, and x1 is a positive integer.

10. The method of claim 7, wherein the second preset depth value is equal to the first preset depth value.

11. The method of claim 7, wherein the second preset depth value is equal to a sum of the first preset depth value and the first adjustment value.

12. The method of claim 7, wherein the second preset depth value is equal to a value obtained by subtracting the second adjustment value from the first preset depth value.

13. The method of claim 7, wherein before writing the single sample index flag bit corresponding to the current image block into the video bitstream, the method further comprises:
calculating a first rate distortion cost corresponding to the current image block using the depth value located in the first index location corresponding to the current image block; and
calculating a second rate distortion cost corresponding to the current image block using the depth value located in the second index location corresponding to the current image block, the first rate distortion cost being less than or equal to the second rate distortion cost, and the single sample index flag bit indicating that the prediction sample value of the at least one of the pixels of the current image block is located in the first index location.

14. The method of claim 7, wherein before writing the single sample index flag bit corresponding to the current image block into the video bitstream, the method further comprises:

calculating a first rate distortion cost corresponding to the current image block using the depth value located in the first index location corresponding to the current image block; and calculating a second rate distortion cost corresponding to the current image block using the depth value located in the second index location corresponding to the current image block, the first rate distortion cost being greater than the second rate distortion cost, and the single sample index flag bit indicating that the prediction sample value of the at least one of the pixels of the current image block is located in the second index location.

15. A video decoding apparatus, comprising:

a memory comprising instructions; and a processor coupled to the memory and configured to execute the instructions, which causes the processor to be configured to:

decode a video bitstream to obtain a single sample flag bit corresponding to a current image block in a current depth map, a size of the current image block being n*n, and n being a positive even number;

perform detection on an upper adjacent pixel of a ((n+2)/2)th pixel on an upper edge of the current image block and a left adjacent pixel of a ((n+2)/2)th pixel on a left edge of the current image block in the current depth map in response to the single sample flag bit indicating that a decoding mode corresponding to the current image block is a single depth intra-frame mode (SDM), available adjacent prediction sampling points of the current image block comprising only the upper adjacent pixel and the left adjacent pixel;

in response to the upper adjacent pixel being available and the left adjacent pixel being available:
set a depth value of the upper adjacent pixel into a first index location corresponding to the current image block; and
set a depth value of the left adjacent pixel into a second index location corresponding to the current image block;

in response to the upper adjacent pixel being available and the left adjacent pixel is unavailable doing at least one of the following four actions:
set the depth value of the upper adjacent pixel into the first index location corresponding to the current image block and set the depth value of the upper adjacent pixel into the second index location corresponding to the current image block;
set the depth value of the upper adjacent pixel into the first index location corresponding to the current image block and set a second depth value obtained by adding the depth value of the upper adjacent pixel to a first adjustment value into the second index location corresponding to the current image block;
set the depth value of the upper adjacent pixel into the first index location corresponding to the current image block and set a third depth value obtained by subtracting a second adjustment value from the depth value of the upper adjacent pixel into the second index location corresponding to the current image block; or
set the depth value of the upper adjacent pixel into the first index location corresponding to the current image block and using a second preset depth value as a candidate value recorded in the second index location corresponding to the current image block;

in response to the upper adjacent pixel being unavailable and the left adjacent pixel being unavailable:
using a first preset depth value as a candidate value recorded in the first index location corresponding to the current image block; and
using the second preset depth value as the candidate value recorded in the second index location corresponding to the current image block;

in response to the upper adjacent pixel being unavailable and the left adjacent pixel being available doing at least one of the following four actions:
set the depth value of the left adjacent pixel into the first index location corresponding to the current image block and set the depth value of the left adjacent pixel into the second index location corresponding to the current image block;
set the depth value of the left adjacent pixel into the first index location corresponding to the current image block and set a fourth depth value obtained by adding the depth value of the left adjacent pixel to the first adjustment value into the second index location corresponding to the current image block;
set the depth value of the left adjacent pixel into the first index location corresponding to the current image block and set a fifth depth value obtained by subtracting the second adjustment value from the depth value of the left adjacent pixel into the second index location corresponding to the current image block; or
set the depth value of the left adjacent pixel into the first index location corresponding to the current image block and using the second preset depth value as the candidate value recorded in the second index location corresponding to the current image block;

decode the video bitstream to obtain a single sample index flag bit corresponding to the current image block;

obtain a candidate depth value located in an index location that is indicated by the single sample index flag bit according to an index location indicated by the single sample index flag bit obtained by decoding;

use the candidate depth value as a prediction sample value of at least one of a plurality of pixels of the current image block; and reconstruct the current image block using the prediction sample value of the at least one of the pixels of the current image block.

16. The video decoding apparatus of claim 15, wherein the first preset depth value is equal to $2^{k1}$, k1 is equal to g_bitDepthY−x1, g_bitDepthY is equal to a quantity of coded bits, the first preset depth value is less than or equal to 255, and x1 is a positive integer.

17. The video decoding apparatus of claim 15, wherein the second preset depth value is equal to $2^{k2}$, k2 is equal to g_bitDepthY−x2, the second preset depth value is less than or equal to 255, x2 is a positive integer not equal to x1, and x1 is a positive integer.

18. The video decoding apparatus of claim 15, wherein the second preset depth value is equal to the first preset depth value.

19. The video decoding apparatus of claim 15, wherein the second preset depth value is equal to a sum of the first preset depth value and the first adjustment value.

20. The video decoding apparatus of claim 15, wherein the second preset depth value is equal to a value obtained by subtracting the second adjustment value from the first preset depth value.

\* \* \* \* \*